United States Patent
Choi et al.

(10) Patent No.: US 9,973,778 B2
(45) Date of Patent: May 15, 2018

(54) METHOD FOR MULTIVIEW VIDEO PREDICTION ENCODING AND DEVICE FOR SAME, AND METHOD FOR MULTIVIEW VIDEO PREDICTION DECODING AND DEVICE FOR SAME

(75) Inventors: Byeong-doo Choi, Siheung-si (KR); Seung-soo Jeong, Seoul (KR); Jeong-Hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 644 days.

(21) Appl. No.: 14/238,139

(22) PCT Filed: Aug. 9, 2012

(86) PCT No.: PCT/KR2012/006333
§ 371 (c)(1),
(2), (4) Date: Feb. 10, 2014

(87) PCT Pub. No.: WO2013/022281
PCT Pub. Date: Feb. 14, 2013

(65) Prior Publication Data
US 2014/0198850 A1 Jul. 17, 2014

Related U.S. Application Data

(60) Provisional application No. 61/521,543, filed on Aug. 9, 2011.

(51) Int. Cl.
*H04N 19/597* (2014.01)
*H04N 13/04* (2006.01)
(Continued)

(52) U.S. Cl.
CPC ....... *H04N 19/597* (2014.11); *H04N 13/0003* (2013.01); *H04N 13/0445* (2013.01);
(Continued)

(58) Field of Classification Search
CPC ............. H04N 19/597; H04N 13/0003; H04N 13/0445
See application file for complete search history.

(56) References Cited

U.S. PATENT DOCUMENTS 8,184,707 B2 5/2012 Ho et al.
8,634,475 B2 1/2014 Jeon et al.
(Continued)

FOREIGN PATENT DOCUMENTS

CN 101455084 A 6/2009
CN 101964909 A 2/2011
(Continued)

OTHER PUBLICATIONS

Communication dated May 17, 2016 issued by Japanese Intellectual Property Office in counterpart Japanese Patent Application No. 2014-524933.

(Continued)

*Primary Examiner* — Robert J Hance
(74) *Attorney, Agent, or Firm* — Sughrue Mion, PLLC

(57) ABSTRACT

A multi-view video prediction method and a multi-view video prediction restoring method. The multi-view video prediction method includes generating a base layer image stream including residual values of I-picture base view key pictures and base view images of a base view by performing inter prediction between the base view images; and generating an enhancement layer image stream comprising residual values of additional view images of an additional view by performing inter-view prediction for predicting the additional view images with reference to the base view images, performing inter prediction for predicting a different additional view key picture with reference to an additional view key picture from among the additional view images, and performing inter prediction for predicting an additional
(Continued)

view image other than the additional view key picture with reference to the additional view images.

12 Claims, 24 Drawing Sheets

(51) Int. Cl.
H04N 13/00 (2018.01)
H04N 19/573 (2014.01)
H04N 19/577 (2014.01)
H04N 19/61 (2014.01)
H04N 19/96 (2014.01)
H04N 19/587 (2014.01)

(52) U.S. Cl.
CPC ......... H04N 19/573 (2014.11); H04N 19/577 (2014.11); H04N 19/587 (2014.11); H04N 19/61 (2014.11); H04N 19/96 (2014.11)

(56) References Cited

U.S. PATENT DOCUMENTS

| | | | |
|---|---|---|---|
| 8,855,200 B2 | 10/2014 | Koo et al. | |
| 2003/0202592 A1 | 10/2003 | Sohn et al. | |
| 2007/0147502 A1* | 6/2007 | Nakamura | H04N 13/0011 375/240.12 |
| 2008/0089428 A1* | 4/2008 | Nakamura | H04N 19/597 375/240.26 |
| 2008/0232470 A1 | 9/2008 | Park et al. | |
| 2008/0273599 A1 | 11/2008 | Park et al. | |
| 2009/0052528 A1 | 2/2009 | Jeon et al. | |
| 2010/0002762 A1* | 1/2010 | Pandit | H04N 19/597 375/240.01 |
| 2010/0111183 A1* | 5/2010 | Jeon | H04N 19/597 375/240.16 |
| 2010/0232510 A1 | 9/2010 | Ho et al. | |
| 2011/0002392 A1 | 1/2011 | Park et al. | |
| 2011/0012994 A1 | 1/2011 | Park et al. | |
| 2013/0322536 A1 | 12/2013 | Yang et al. | |

FOREIGN PATENT DOCUMENTS

| | | |
|---|---|---|
| CN | 101986713 A | 3/2011 |
| CN | 102577376 A | 7/2012 |
| KR | 10-2007-0076391 A | 7/2007 |
| KR | 10-2008-0007086 A | 1/2008 |
| KR | 10-2008-0016266 A | 2/2008 |
| KR | 10-2008-0037593 A | 4/2008 |
| TW | 200930099 A | 7/2009 |
| TW | I328801 B | 8/2010 |
| TW | 201041402 A1 | 11/2010 |
| WO | 2007/114608 A1 | 10/2007 |
| WO | 2008/051041 A1 | 5/2008 |

OTHER PUBLICATIONS

Communication dated Oct. 7, 2015, issued by the Taiwan Intellectual Property Office in counterpart Taiwanese Patent Application No. 101128838.
Communication dated Feb. 9, 2015 issued by the European Patent Office in counterpart European Patent Application No. 12822450.8.
Communication dated Mar. 4, 2015 issued by the Mexican Patent Office in counterpart Mexican Patent Application No. MX/a/2014/001617.
Philipp Merkle et al.; "Efficient Prediction Structures for Multiview Video Coding"; IEEE Transactions on Circuits and Systems for Video Technology; vol. 17; No. 11; Nov. 2007; 14 pages total.
"Description of Core Experiments in Multiview Video Coding"; International Organisation for Standardisation Organisation Internationale de Normalisation; ISO/IEC JTC1/SC29/WG11 Coding of Moving Pictures and Audio; Apr. 2006; pp. 1-38.
Woo-sung Shim et al.; "High level syntax for flexible I-frame position"; Joint Video Team (JVT) of ISO/IEC MPEG & ITU-T VCEG (ISO/IEC JTC1/SC29/WG11 and ITU-T SG16 Q.6); Oct. 2006; pp. 1-16.
Written Opinion dated Feb. 7, 2013 issued in International Application No. PCT/KR2012/006333 (PCT/ISA/237).
Communication dated Sep. 2, 2016 issued by the State Intellectual Property Office of P.R. China in counterpart Chinese Patent Application No. 201280049636.4.
Communication dated Mar. 7, 2017, issued by the State Intellectual Property Office of the People's Republic of China in counterpart Chinese Patent Application No. 201280049636.4.
Communication dated Jul. 24, 2017 by the State Intellectual Property Office of P.R. China in counterpart Chinese Patent Application No. 201280049636.4.
Communication issued by the State Intellectual Property Office of P.R. China dated Feb. 22, 2018 in counterpart Chinese Patent Application No. 201280049636.4.

* cited by examiner

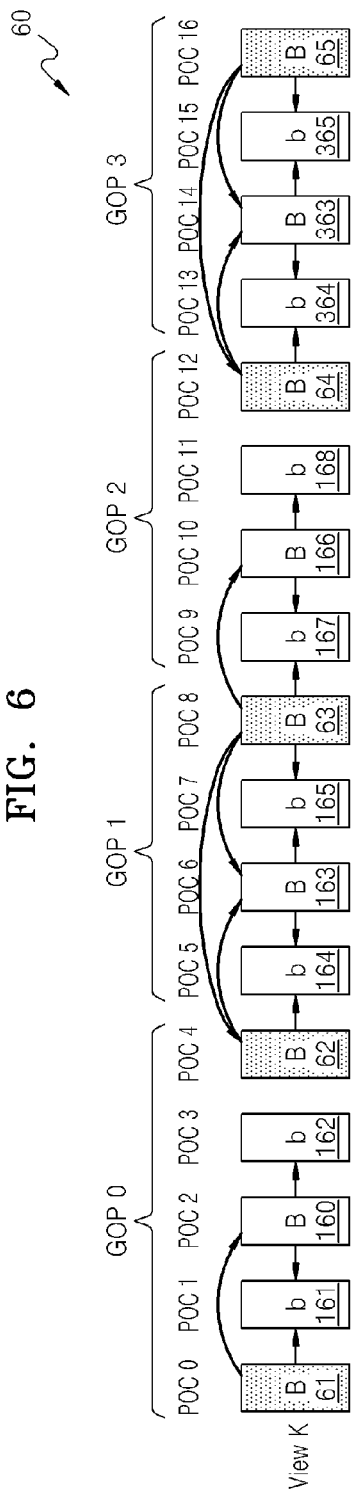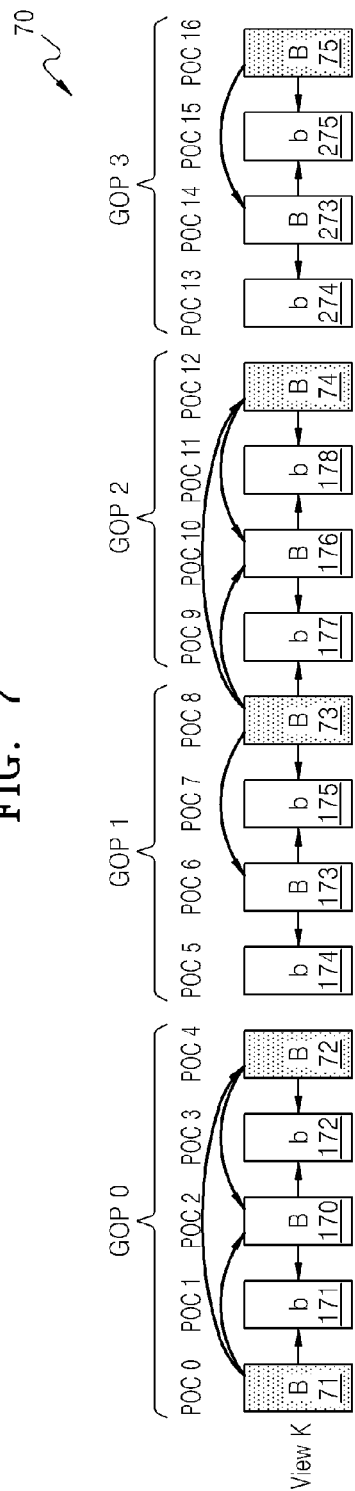

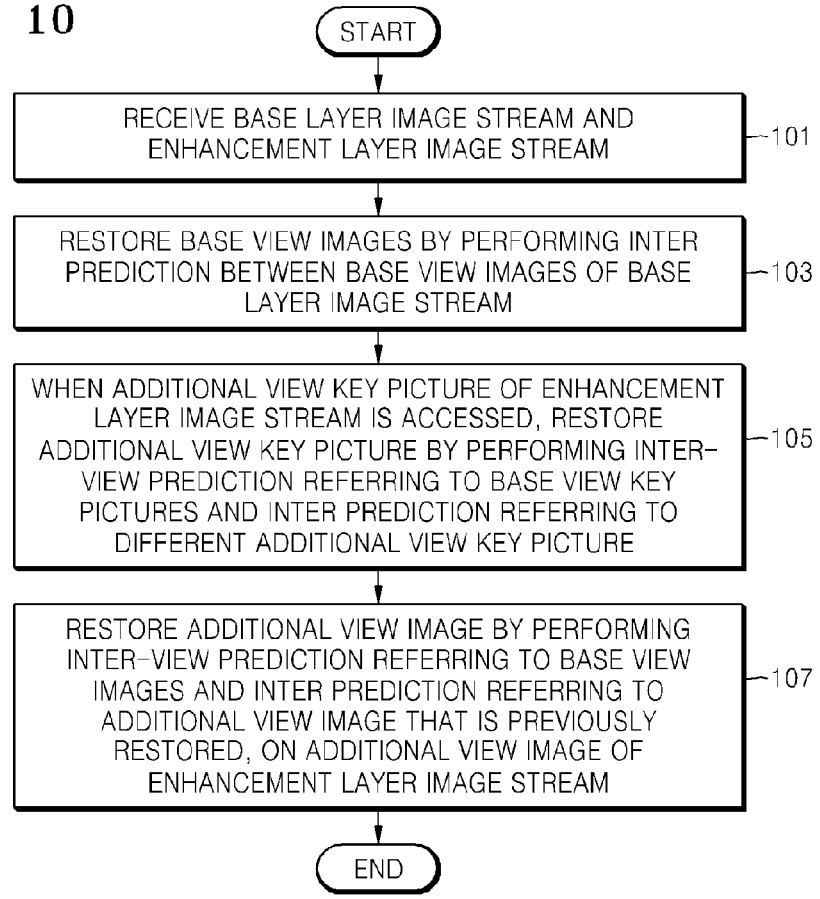

FIG. 17
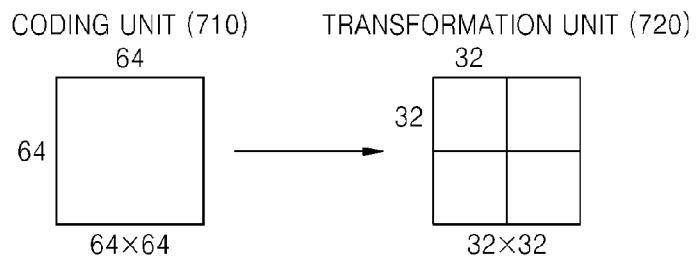
FIG. 18
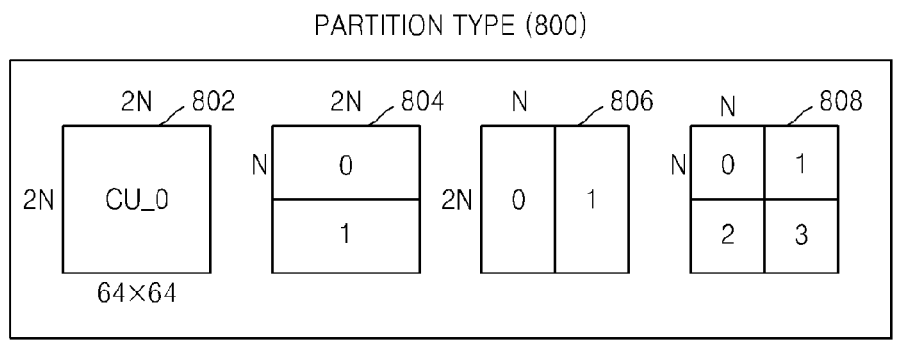
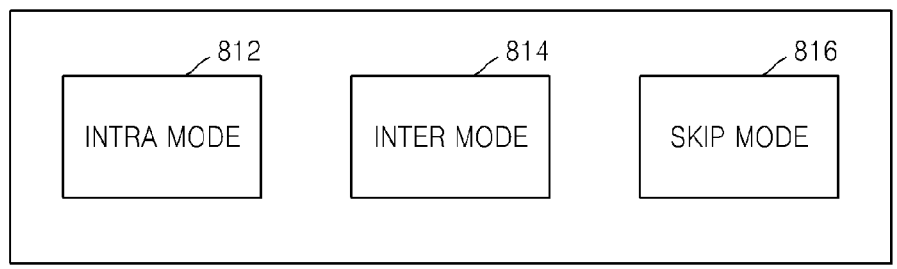
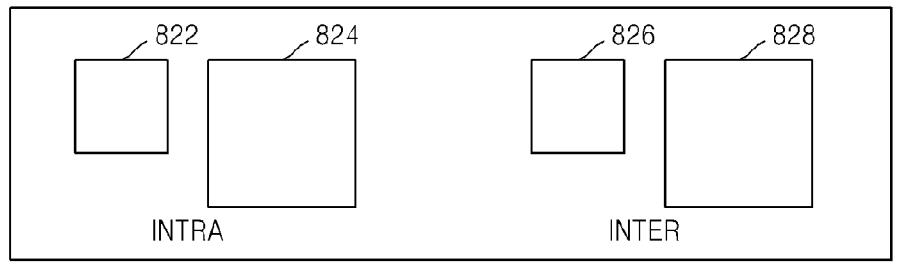

CODING UNIT (1010)

PREDICTION UNIT (1060)

METHOD FOR MULTIVIEW VIDEO PREDICTION ENCODING AND DEVICE FOR SAME, AND METHOD FOR MULTIVIEW VIDEO PREDICTION DECODING AND DEVICE FOR SAME

CROSS-REFERENCE TO RELATED APPLICATION

This application is a National Stage Application under 35 U.S.C. § 371 of International Application No. PCT/KR2012/006333, filed on Aug. 9, 2012, and claims the benefit of U.S. Provisional Application No. 61/521,543, filed on Aug. 9, 2011, in the U.S. Patent and Trademark Office, the disclosures of which are incorporated herein by reference in their entireties.

1. FIELD

The present invention relates to methods and apparatuses for encoding and decoding a video via inter prediction and motion compensation in a multi-view video prediction structure.

2. DESCRIPTION OF RELATED ART

As hardware for reproducing and storing high resolution or high quality video content is developed, there is an increasing need for a video codec for effectively encoding or decoding the high resolution or high quality video content. According to a conventional video codec, video is encoded according to a limited encoding method that is based on a macroblock having a predetermined size.

Image data of a spatial region is transformed into coefficients of a frequency region via frequency transformation. According to a video codec, an image is split into blocks having a predetermined size, discrete cosine transformation (DCT) is performed for each respective block, and frequency coefficients are encoded in block units, for rapid calculation of frequency transformation. Compared with image data of a spatial region, coefficients of a frequency region are easily compressed. In particular, since an image pixel value of a spatial region is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

According to a multi-view video codec, a base view video and one or more additional view videos are encoded. By removing temporal/spatial redundancy between the base view video and the additional view video and redundancy between views, an amount of data of the base view video and the additional view video can be reduced.

SUMMARY

Apparatuses and methods consistent with exemplary embodiments provide a method and apparatus for multi-view video encoding and decoding via inter prediction of additional view images and inter-view prediction of an enhancement layer image stream.

According to an aspect of an exemplary embodiment, there is provided a multi-view video prediction method including generating a base layer image stream comprising residual values of I-picture base view key pictures and base view images of a base view by performing inter prediction between the base view images, and generating an enhancement layer image stream comprising residual values of additional view images of an additional view by performing inter-view prediction for predicting the additional view images with reference to the base view images, performing inter prediction for predicting a different additional view key picture with reference to an additional view key picture from among the additional view images, and performing inter prediction for predicting an additional view image other than the additional view key picture with reference to the additional view images.

According to an aspect of an exemplary embodiment, there is provided a multi-view video prediction restoring method including receiving a base layer image stream and an enhancement layer image stream, restoring from the base layer image stream an I-picture base view key picture and restoring base view images of a base view by performing motion compensation of the base view images with reference to the base view key picture, accessing an additional view key picture of an additional view in the enhancement layer image stream, restoring the additional view key picture by performing at least one of disparity compensation referring to the restored base view key pictures and motion compensation referring to a different additional view key picture of the enhancement layer image stream, in response to the accessing, and restoring an additional view image other than the additional view key picture by performing at least one of disparity compensation referring to the restored base view images and performing motion compensation referring to a restored additional view image that is first restored in the enhancement layer image stream on an additional view image of the enhancement layer image stream.

According to an aspect of an exemplary embodiment, there is provided a multi-view video prediction apparatus including a base layer encoder configured to generate a base layer image stream comprising residual values of I-picture base view key pictures and base view images of a base view by performing inter prediction between the base view images and an enhancement layer encoder configured to perform inter-view prediction for predicting additional view images of an additional view with reference to the base view images, perform inter prediction for predicting a different additional view key picture with reference to an additional view key picture from among the additional view images, and perform inter prediction for predicting an additional view image other than the additional view key picture with reference to the additional view images, and configured to generate an enhancement layer image stream comprising residual values of the additional view images.

According to an aspect of an exemplary embodiment, there is provided a multi-view video prediction restoring apparatus including a receiver configured to receive a base layer image stream and an enhancement layer image stream, a base layer decoder configured to restore from the base layer image stream an I-picture base view key picture and base view images of a base view by performing motion compensation of the base view images with reference to the base view key picture, and an enhancement layer decoder configured to restore, in response to an additional view key picture of an additional view in the enhancement layer image stream being accessed, restore the additional view key picture by performing at least one of disparity compensation referring to the restored base view key pictures and performing motion compensation referring to a different additional view key picture of the enhancement layer image stream, and configured to restore an additional view image other than the additional view key picture by performing at least one of disparity compensation referring to the restored base view images and motion compensation referring to a restored additional view image that is first restored in the enhancement layer image stream on an additional view image of the enhancement layer image stream.

BRIEF DESCRIPTION OF THE DRAWINGS

FIG. 6 shows an inter prediction structure of an enhancement layer for additional view images from among multi-view video prediction structures, according to another exemplary embodiment;

FIG. 7 shows an inter prediction structure of an enhancement layer for additional view images from among multi-video prediction structures, according to another exemplary embodiment;

FIG. 9 is a flowchart of a multi-view video prediction method according to an exemplary embodiment;

FIG. 10 is a flowchart of a multi-view video prediction restoring method according to an exemplary embodiment;

FIG. 17 is a diagram for describing a relationship between a coding unit and transformation units, according to an exemplary embodiment;

FIG. 18 is a diagram for describing encoding information of coding units corresponding to a coded depth, according to an exemplary embodiment;

DETAILED DESCRIPTION OF EXEMPLARY EMBODIMENTS

Hereinafter, a multi-view video prediction apparatus, a multi-view video prediction restoring apparatus, a multi-view video prediction method, and a multi-view video prediction restoring method will be described with reference to FIGS. 1 through 10. A multi-view video prediction apparatus, a multi-view video prediction restoring apparatus, a multi-view video prediction method, and a multi-view video prediction restoring method, based on coding units having a tree structure, will be described with reference to FIGS. 11 through 23. In addition, a multi-view video prediction method, a multi-view video prediction restoring method, a video encoding method, and a video decoding method will be described with reference to FIGS. 24A through 29. Hereinafter, the term 'image' may refer to a still image or a moving picture, that is, a video itself.

First, with reference to FIGS. 1 through 10, a multi-view video prediction apparatus, a multi-view video prediction restoring apparatus, a multi-view video prediction method, and a multi-view video prediction restoring method according to an exemplary embodiment will be described.

Figure 1:
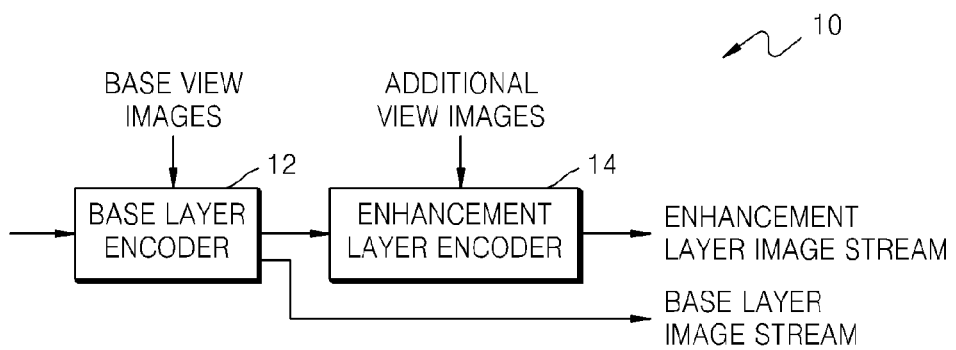
FIG. 1 is a block diagram of a multi-view video prediction apparatus according to an exemplary embodiment.

FIG. 1 is a block diagram of a multi-view video prediction apparatus 10 according to an exemplary embodiment.

The multi-view video prediction apparatus 10 includes a base layer encoder 12 and an enhancement layer encoder 14.

The multi-view video prediction apparatus 10 encodes base view images and additional view images. For example, left view images and right view images may be encoded, the encoding result of the left view images may be output in a base layer image stream, and the encoding result of the right view images may be output in an enhancement layer image stream.

In the presence of two or more additional views, base view images, first additional view images about a first additional view, second additional view images about a second additional view, and through $K_{th}$ additional view images about a $K_{th}$ additional view may be encoded. Thus, the encoding result of the base view images may be output in a base layer image stream and the encoding result of the first, second, through $K_{th}$ additional view images may be respectively output in first, second, through $K_{th}$ enhancement layer image streams. The base view images may comprise one or more key pictures (i.e. anchor pictures).

Also, each of the first, second, and $K_{th}$ additional view images may comprise one or more key pictures (i.e. anchor pictures), respectively.

The multi-view video prediction apparatus 10 encodes each video image for each respective block. A block may have a square shape, a rectangular shape, or any geometric shape and is not limited to a data unit having a predetermined size. According to an exemplary embodiment, a block may be a maximum coding unit, a coding unit, a prediction unit, a transformation unit, or the like from among coding units according to a tree structure. Video encoding and decoding methods based on coding units according to a tree structure will be described below with reference to FIGS. 11 through 23.

The multi-view video prediction apparatus 10 may perform inter prediction for performing prediction by referring the same view images. In addition, the multi-view video prediction apparatus 10 may perform inter-view prediction for predicting additional view images with reference to the base view images. The multi-view video prediction apparatus 10 may perform inter-view prediction for predicting the second additional view images with reference to the first additional view images. Inter prediction and inter-view prediction may be performed based on a block, such as a coding unit, a prediction unit, a transformation unit, or the like.

The base layer encoder 12 may encode the base view images to generate a base layer image stream. The base layer encoder 12 may perform inter prediction between the base view images. The base layer encoder 12 may encode base view key pictures that are I-picture type images from among the base view images without referring to any image. The base layer encoder 12 may perform inter prediction on base view images except for a base view key picture with reference to different base view images.

The base layer encoder 12 may generate residual values via inter prediction of the base view images, except for the base view key picture, and may encode the residual value. For example, transformation, quantization, quantization, entropy encoding, or the like may be performed on an image block of the residual value.

The base layer encoder 12 may generate a base layer image stream including encoded data of the base view key picture and encoded data of residual values of the remaining base view images.

The enhancement layer encoder 14 may encode the additional view images to generate the enhancement layer image stream. The enhancement layer encoder 14 may perform inter-view prediction referring to the base view images and inter prediction referring to images of the same view to encode the additional view images.

The enhancement layer encoder 14 may perform inter-view prediction for predicting the additional view images with reference to the base view images. With regard to a predetermined additional view, inter-view prediction may be performed with reference to the base view images and images of different additional views, instead of a current additional view.

In addition, the enhancement layer encoder 14 may perform inter prediction for predicting different additional view key pictures with reference to the additional view key picture from among the additional view images. Alternatively, the enhancement layer encoder 14 performs both of inter prediction for predicting different additional view key pictures and inter prediction for different view images on some additional view key pictures from among the additional view key pictures, but may perform only inter-view prediction referring to the base view key picture without performing inter prediction referring to different additional view key pictures on the remaining additional view key pictures.

In addition, the enhancement layer encoder 14 may perform inter prediction referring to the additional view images to predict the remaining additional view images except for the additional view key picture. Both internal-view prediction referring for the base view image and inter prediction referring to images of the same view may be performed on additional view images except for a key picture.

The enhancement layer encoder 14 may encode residual values of additional view images, which are generated via the inter-view prediction referring to the base view images and inter prediction referring to images of the same view. In detail, transformation, quantization, entropy encoding, or the like may be performed on an image block of the residual value. Thus, the enhancement layer encoder 14 may generate an enhancement layer image stream including encoded data of the residual values of the additional view images.

The enhancement layer encoder 14 may perform inter prediction of a current additional view key picture with reference to an additional view key picture that is restored prior to restoration of the current additional view key picture from among additional view key pictures.

Alternatively, the enhancement layer encoder 14 may perform inter prediction of a current additional view key picture with reference to an additional view key picture that is restored after restoration of the current additional view key.

The enhancement layer encoder 14 may exclude a key picture that is predicted with reference to different key pictures of the same view, from reference images for additional view images. As another example, a key picture that is predicted with reference to different key pictures of the same view may be included in a reference image for additional view images.

The multi-view video prediction apparatus 10 may generate a depth map between multi-view images. The multi-view video prediction apparatus 10 may generate the depth map indicating an inter-view depth for each respective base view image and additional view image, from among base view images and additional view images.

The multi-view video prediction apparatus 10 may encode and transmit the depth maps along with the base layer image stream and the enhancement layer image stream.

The multi-view video prediction apparatus 10 may include a central processing unit (not shown) for controlling the base layer encoder 12 and the enhancement layer encoder 14. Alternatively, the base layer encoder 12 and the enhancement layer encoder 14 may be controlled by respective processors (not shown) and the processors may cooperatively interact with each other to control an overall operation of the multi-view video prediction apparatus 10. Alternatively, the base layer encoder 12 and the enhancement layer encoder 14 may be controlled according to control of an external processor (not shown) of the multi-view video prediction apparatus 10.

The multi-view video prediction apparatus 10 may include at least one memory (not shown) for storing data that is input to and from the base layer encoder 12 and the enhancement layer encoder 14. The multi-view video prediction apparatus 10 may include a memory controller (not shown) for controlling input/output of data of a memory (not shown).

Figure 2:
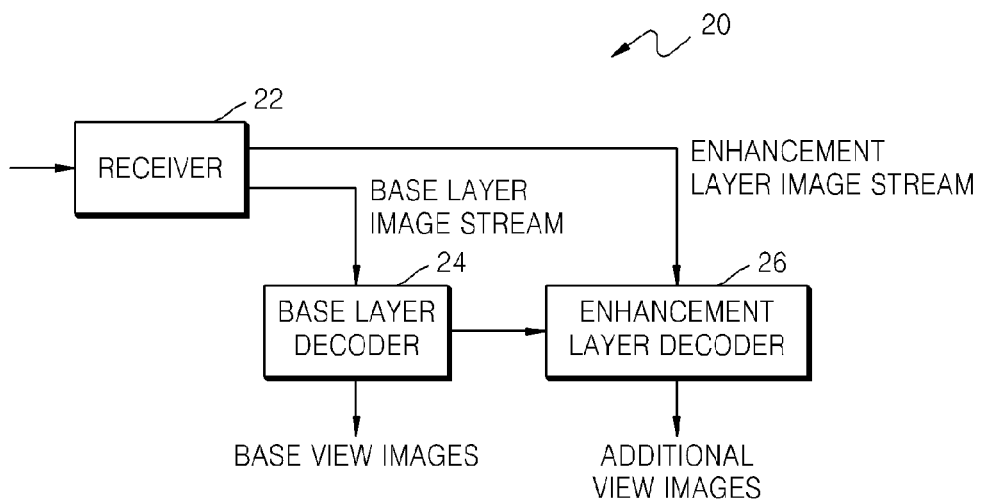
FIG. 2 is a block diagram of a multi-view video prediction restoring apparatus according to an exemplary embodiment.

FIG. 2 is a block diagram of a multi-view video prediction restoring apparatus 20 according to an exemplary embodiment.

The multi-view video prediction restoring apparatus 20 includes a receiver 22, a base layer decoder 24, and an enhancement layer decoder 26.

The receiver 22 receives a base layer image stream and an enhancement layer image stream.

The receiver 22 may receive a depth map indicating an inter-view depth between a base view image and an additional view image of the same scene from among the base view images and the additional view images, along with the base layer image stream and the enhancement layer image stream.

The multi-view video prediction restoring apparatus 20 may decode the base layer image stream and the enhancement layer image stream and may restore the base view images and the additional view images. For example, left view images may be restored from the base layer image stream and right view images may be restored from the enhancement layer image stream. In the presence of two or more additional views, the base view images may be restored from the base layer image stream, and first additional view images about a first additional view, second additional view images about a second additional view, and $K_{th}$ additional view images about a $K_{th}$ enhancement layer image stream may be restored from a first enhancement layer image stream, a second enhancement layer image stream, and a $K_{th}$ enhancement layer image stream, respectively.

The multi-view video prediction restoring apparatus 20 decodes each video image for each respective block. According to an exemplary embodiment, a block may be a maximum coding unit, a coding unit, a prediction unit, a transformation unit, or the like from among coding units according to a tree structure.

The multi-view video prediction restoring apparatus 20 may perform motion compensation for referring the same view images predicted via the inter prediction to restore images. In addition, the multi-view video prediction restoring apparatus 20 may perform disparity compensation with reference to base view images to restore the additional view image predicted via the inter-view prediction. The disparity compensation refers to an operation for compensating disparity between views of different view images.

The multi-view video prediction restoring apparatus 20 may perform inter-view prediction for restoring the second additional view images predicted with reference to the first additional view images. Images may be restored via inter prediction and inter-view prediction based on a coding unit or a prediction unit.

When the base layer decoder 24 receives the base layer image stream, the base layer decoder 24 decodes the base layer image stream and restores the base view images. In detail, entropy decoding, inverse quantization, and inverse transformation may be performed on symbols that are extracted by parsing the base layer image stream to restore residual values of prediction. The base layer decoder 24 may receive a bitstream of quantized transformation coefficients. Inverse quantization and inverse transformation may be performed on the quantized transformation coefficients to restore a residual value. The base layer decoder 24 may restore base view images via inter prediction.

The base layer decoder 24 may decode the quantized transformation coefficients of base view key pictures that are I-picture type images of the base layer image stream to restore the base view key pictures. The base layer decoder 24 may restore the base view key pictures that are I-picture type images from among the base view images without referring to different base view images.

The base layer decoder 24 may restore base view images except for the base view key picture via motion compensation referring to different base view images. With regard to base view images except for the base view key picture of an image stream, the base layer decoder 24 may decode the quantized transformation coefficients of the residual values of the base view images and may compensate for the base view image that is a reference image by as much as the residual values to restore the base view images.

The enhancement layer decoder 26 decodes the enhancement layer image stream to restore the additional view images. In detail, entropy encoding, inverse quantization, and inverse transformation are performed on symbols that are extracted by parsing the enhancement layer image stream to restore residual values for each respective block. The residual values may be restored by receiving a bitstream of the quantized transformation coefficients of the residual values and performing inverse quantization and inverse transformation on the bitstream.

The enhancement layer decoder 26 may restore the additional view images via inter-view prediction referring to the base view images restored from the base layer image stream and inter prediction referring to images of the same view to restore the enhancement layer image stream.

The enhancement layer decoder 26 may restore the additional view images via inter-view prediction referring to the base view images restored by the base layer decoder 24. With regard to a predetermined additional view, additional view images may be restored with reference to images of different additional views instead of the current additional view as well as base view images.

Disparity information between a base view image and an additional view image or a depth map between the base view image and the additional view image may be extracted from the enhancement layer image stream. The enhancement layer decoder 26 may restore the additional view image by using the disparity information or depth map between the base view image and the additional view image.

Alternatively, the enhancement layer decoder 26 may restore the additional view key pictures via inter prediction for decoding different additional view key pictures with reference to additional view key pictures. The enhancement layer decoder 26 may restore some additional view key pictures via both inter prediction referring to different additional view key pictures and inter-view prediction referring to base view key pictures. However, the remaining additional view key pictures may be restored by performing only inter-view prediction referring to the base view key picture without performing inter prediction referring to different additional view key pictures.

The enhancement layer decoder 26 may restore the remaining additional view images except for additional view key pictures via inter prediction referring to additional view images. Additional view images except for key pictures may be restored via inter-view prediction referring to a base view image and inter prediction referring to images of the same view.

The additional view images except for the additional view key pictures may be restored via motion compensation referring to different additional view images. That is, the enhancement layer decoder 26 may decode a motion vector of the additional view images of the enhancement layer image stream and encoding data of a residual value, may determine a reference image from among different additional view images by using the motion vector, and may compensate for the reference image by as much as the residual values to restore the additional view images except for the additional view key picture. A reference block may be determined from among reference blocks by using a motion vector of a current block of a current image.

When the enhancement layer decoder 26 accesses a current additional view key picture to reproduce the current additional view key picture, a process for restoring the additional view key picture may be changed according to whether inter prediction is required.

When the enhancement layer decoder 26 accesses the current additional view key picture that is predicted with reference to an additional view key picture restored prior to the current additional view key picture from among the additional view key picture, the current additional view reference image may be restored by using a depth map and a base view image corresponding to the current additional view key picture.

Alternatively, when the enhancement layer decoder 26 accesses the current additional view key picture that is predicted with reference to an additional view key picture restored prior to the current additional view key picture from among the additional view key pictures, restoration of the current additional view key picture may be skipped, and a next additional view key picture of the current additional view key picture may be restored.

When the enhancement layer decoder 26 accesses the current additional view key picture that is predicted with reference to an additional view key picture to be restored after the current additional view key picture is restored from among the additional view key picture, the current additional view key picture may be restored by using the base view key picture corresponding to the current additional view key picture and a depth map of the current additional view key picture. That is, restoration of the current additional view key picture is not delayed until the additional view key picture as a reference image is restored, the current additional view key picture may be restored by using a depth map.

Alternatively, when the enhancement layer decoder 26 accesses the current additional view key picture that is predicted with reference to an additional view key picture to be restored after the current additional view key picture is restored from among the additional view key picture, restoration of the current additional view key picture may be delayed. Thus, after the additional view key picture that is a reference image is restored, the enhancement layer decoder 26 may restore the current additional view key picture with reference to a result of restoring the additional view key picture.

When the enhancement layer decoder 26 accesses the current additional view key picture that does not refer to different additional view key pictures from among additional view key pictures, the current additional view key picture may be restored via disparity compensation referring to a base view image corresponding to the current additional view key picture. Alternatively, when the enhancement layer decoder 26 accesses the current additional view key picture that does not refer to different additional view key pictures from among additional view key pictures, the current additional view key picture may be restored by using a base view image corresponding to the current additional view key picture and a depth map.

The enhancement layer decoder 26 may add an additional view key picture referring to different key pictures of the same view to reference images for additional view images.

Alternatively, the enhancement layer decoder 26 may not add an additional view key picture referring to different key pictures of the same view to reference images for additional view images.

Thus, after the accessed additional view key pictures are restored, the remaining additional view key pictures that directly or indirectly refer to the restored additional view key picture may also be restored.

The multi-view video prediction restoring apparatus 20 may include a central processor (not shown) for generally controlling the receiver 22, the base layer decoder 24, and the enhancement layer decoder 26. Alternatively, the receiver 22, the base layer decoder 24, and the enhancement layer decoder 26 may be controlled by respective processors (not shown) and the processors may cooperatively interact with each other to control an overall operation of the multi-view video prediction restoring apparatus 20. Alternatively, the receiver 22, the base layer decoder 24, and the enhancement layer decoder 26 may be controlled according to control of an external processor (not shown) of the multi-view video prediction restoring apparatus 20.

The multi-view video prediction restoring apparatus 20 include at least one memory (not shown) for storing data that is input to and from the receiver 22, the base layer decoder 24, and the enhancement layer decoder 26. The multi-view video prediction restoring apparatus 20 may include a memory controller (not shown) for controlling input/output of data of a memory (not shown).

Since the multi-view video prediction apparatus 10 performs inter prediction on some key pictures from among the additional view images, coding efficiency of the additional view images may be increased and a bit rate of the enhancement layer image stream may be reduced. In addition, since encoding of depth maps as well as inter-view prediction is performed, coding efficiency of a multi-view video may be increased.

The multi-view video prediction restoring apparatus 20 may restore the additional view key picture via inter prediction referring to key pictures of the same view as well as via inter-view prediction referring to the base view images. In addition, when key pictures of the same view, which are reference images are not restored, the additional view key may be restored from a base view image by using a depth map. Moreover, a video of three or more views may be restored by using a depth map and residual values generated via inter-view prediction between a plurality of views.

Figure 3:
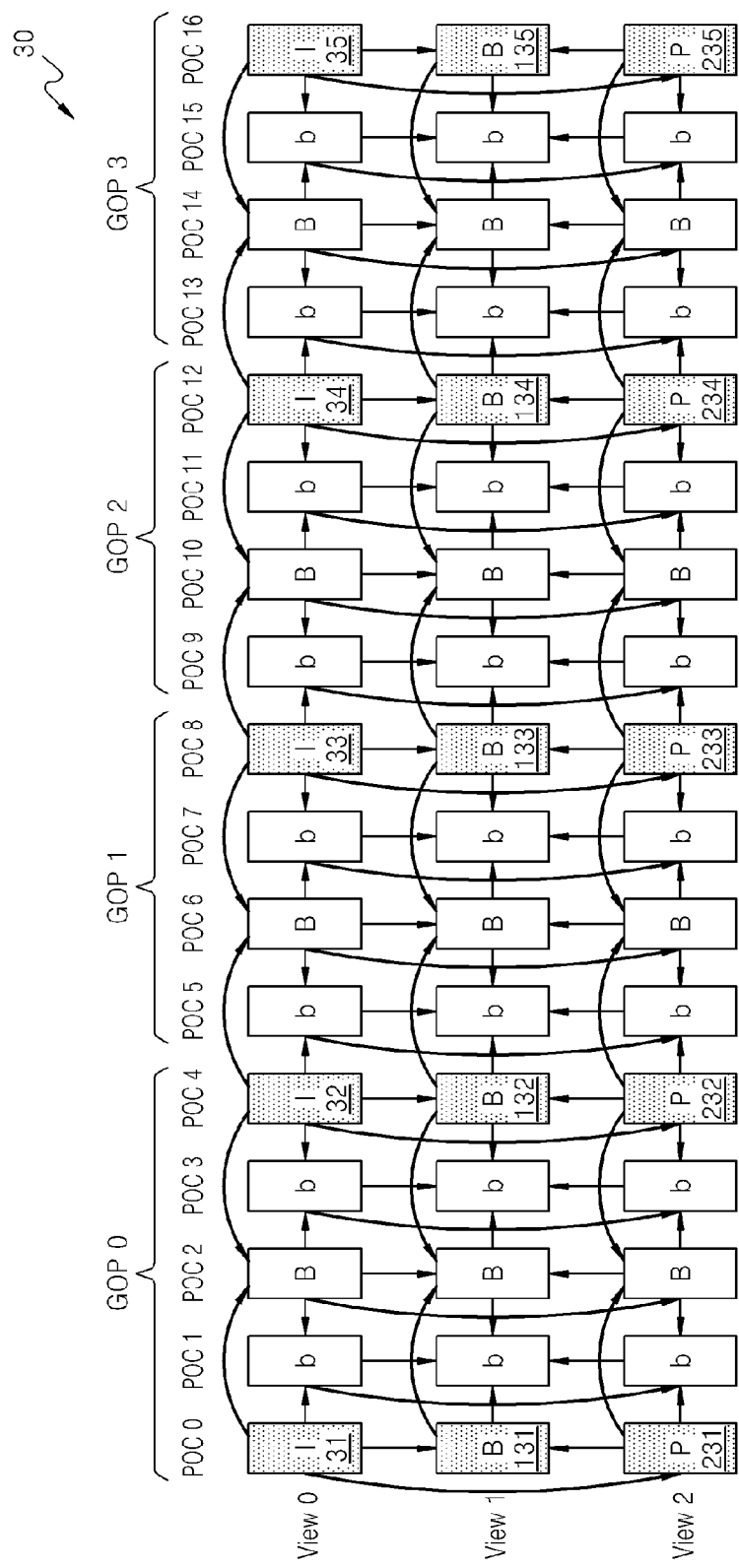
FIG. 3 is a diagram of a multi-view video prediction structure, according to an exemplary embodiment.

FIG. 3 is a diagram of a multi-view video prediction structure 30, according to an exemplary embodiment.

In general, in the multi-view video prediction structure 30, images of the same view are arranged in a horizontal direction and images having the same picture order count (POC) are arranged in a vertical direction. Thus, images of a base view "View 0" are arranged in the horizontal direction according to a POC, images of a first additional view "View 1" are arranged in the horizontal direction according to a POC, and images of a second additional view "View 2" may be arranged in the horizontal direction according to a POC. In addition, a first additional view image and a second additional image, which are positioned at the same column as a base view image, have different views, but have the same POC.

Four consecutive images of view images constitute a single group of pictures (GOP). Each GOP includes images between consecutive key pictures and a single key picture. The key picture is a random access point. In this regard, when a predetermined reproducing position is selected from images that are arranged according to a reproducing order of an image, that is, according to a POC, a key picture of which a POC is most adjacent to the reproducing position is reproduced. Base view images include base view key pictures 31, 32, 33, 34, and 35, first additional view images include first additional view key pictures 131, 132, 133, 134, and 135, and second additional view images include second additional view key pictures 231, 232, 233, 234, and 235.

In the multi-view video prediction structure 30, both inter-view prediction and inter prediction are performed on images. In the multi-view video prediction structure 30, an image from which an arrow is started, and an image to which an arrow is directed, is an image that is predicted by using the reference image.

The predicting result of the base view images may be encoded and then may be output in the form of a base layer image stream, and the prediction result of the additional view images may be encoded and then may be output in the form of an enhancement layer image stream. In addition, the predicting result of the first additional view images may be output in a first enhancement layer image stream and the predicting result of the second additional view images may be output in a second enhancement layer image stream.

Only inter prediction is performed on base view images. That is, key pictures that are I-pictures type key pictures do not refer to different images. However, the remaining images that are B-picture type images and b-picture type images are predicted with reference to different base view images. The B-picture type images are predicted with reference to an I-picture type key picture having an early POC order and an I-picture type key picture having a late POC order. b-picture type images are predicted with reference to an I-picture type key picture having an early POC order and a B-picture type image having a late POC order or a B-picture type image having an early POC order and an I-picture type key picture having a late POC order.

Inter-view prediction referring to different view images and inter prediction referring to the same view images are performed on the first additional view images and the second additional view images.

Like the base view images, inter prediction is also performed on the first additional view images and inter prediction is also performed on the second additional view images. Key pictures 131, 132, 133, 134, 135, 231, 232, 233, 234, and 235 from among the first additional view images and the second additional view images do not refer to the same view images, and the remaining images that are not key pictures are predicted with reference to the same view images.

However, since the key pictures 131, 132, 133, 134, 135, 231, 232, 233, 234, and 235 from among the first additional view images and the second additional view images may also refer to base view key pictures having the same POC order, the key pictures 131, 132, 133, 134, 135, 231, 232, 233, 234, and 235 are each a P-picture type image or a B-picture type image.

Since the first additional view key pictures 131, 132, 133, 134, and 135 are predicted with reference to second additional view key pictures 231, 232, 233, 234, and 235 and base view key pictures 31, 32, 33, 34, and 35, which respectively have the same POC order, the first additional view key pictures 131, 132, 133, 134, and 135 may be B-picture type images. Since the second additional view key pictures 231, 232, 233, 234, and 235 are predicted with reference to only the base view key pictures 31, 32, 33, 34, and 35 having the same POC order, the second additional view key pictures 231, 232, 233, 234, and 235 are P-picture type images.

Since inter-view prediction referring to different view images having the same POC order as well as inter prediction may be performed on the remaining images that are not the key pictures 131, 132, 133, 134, 135, 231, 232, 233, 234, and 235 from among the first additional view images and the second additional view images, the remaining images are B-picture type images or b-picture type images.

A restoration process for reproducing images is similar to a prediction process. However, each image may be restored by using a reference image only after the reference image of each image is restored.

First, base view images may be restored via inter prediction. When the base view key pictures 31, 32, 33, 34, and 35 that are I-picture type images are restored, base view images that are B-picture type images are restored with reference to the base view key pictures 31, 32, 33, 34, and 35 and base view images that are b-picture type images with reference to I-picture type or B-picture type base view restoration images.

Since the second additional view images are encoded via inter-view prediction referring to the base view images and inter prediction referring to the second additional view images, only after a reference image of a base view and a reference image of a second additional view are restored, a second additional view image may be restored by using the restored reference images.

Since the first additional view images are encoded via inter-view disparity compensation referring to the base view images and the second additional view images and inter motion compensation referring to the first additional view images, after a reference image of a base view, a reference image of a second additional view, and a reference image of a first additional view are restored, the first additional view image may be restored by using the restored reference images.

Figure 4A:
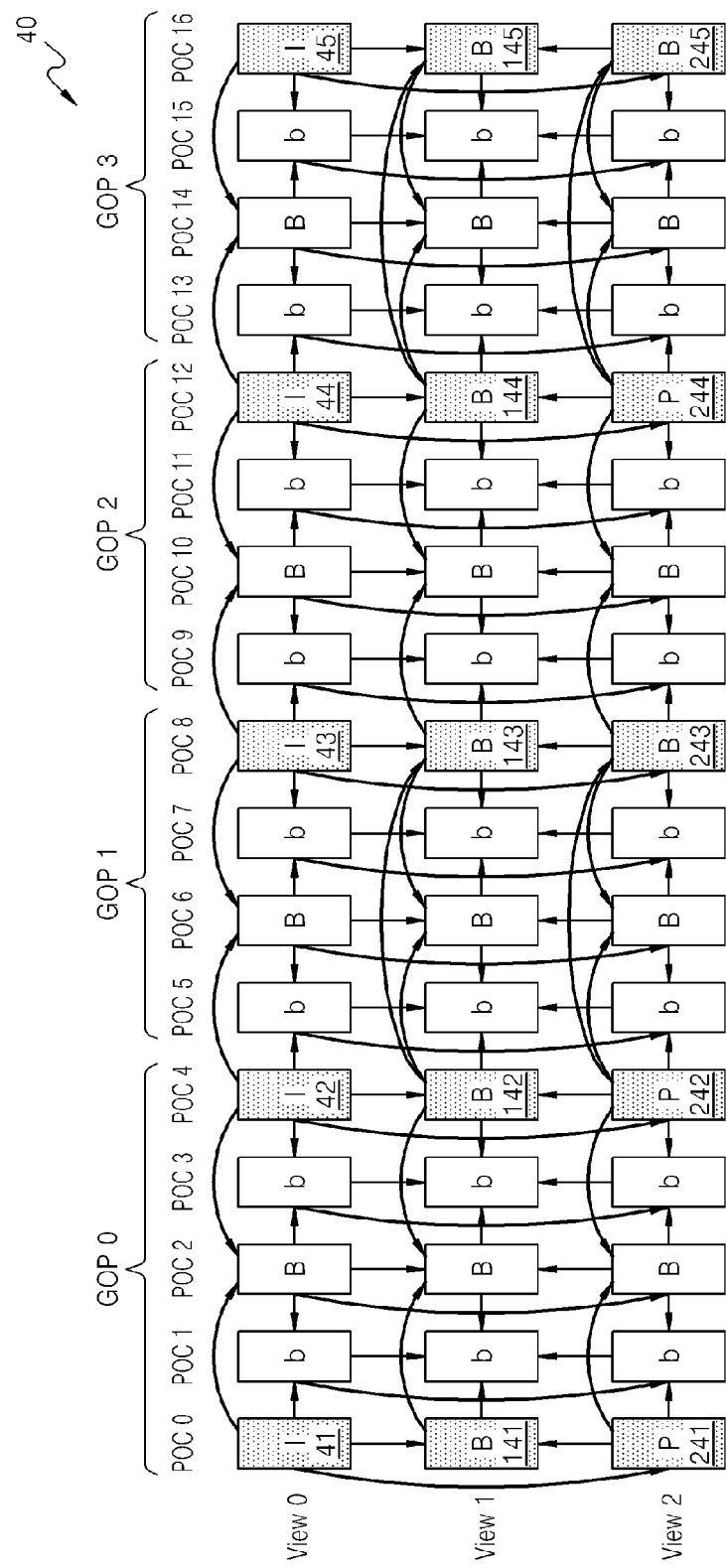
FIG. 4A is a diagram of a multi-view video prediction structure, according to another exemplary embodiment.

FIG. 4A is a diagram of a multi-view video prediction structure 40, according to another exemplary embodiment.

In the multi-view video prediction structure 40, both inter-view prediction and inter prediction are also performed on images.

The multi-view video prediction apparatus 10 may prediction-encode the base view images, the first additional view images, and the second additional view images according to the multi-view video prediction structure 40.

The multi-view video prediction apparatus 10 may output a base layer image stream including the prediction and encoding results of the base view images and may output the first enhancement layer image stream including the prediction encoding result of the first additional view images and the second enhancement layer image stream including the prediction encoding result of the second additional view images.

The multi-view video prediction restoring apparatus 20 may restore the base view images, the first additional view images, and the second additional view images according to the multi-view video prediction structure 40.

The multi-view video prediction restoring apparatus 20 may decode the received base layer image stream to restore the base view images, may decode the received first enhancement layer image stream to restore the first additional view images, and may decode the receive second enhancement layer image stream to restore the second additional view images.

Only inter prediction is performed on the base view images. Inter-view prediction referring to different view images and inter prediction referring to the same view images are performed on the first additional view images and the second additional view images.

Inter-view prediction referring to the base view image and the second additional view image, which have the same POC order, may be performed on the first additional view image. In addition, inter-view prediction referring to the base view images having the same POC order may be performed on the second additional view image.

Inter prediction is also performed on the first additional view images and the second additional view images.

However, unlike in the multi-view video prediction structure 30, in the multi-view video prediction structure 40, some key pictures 143, 145, 243, and 245 of key pictures 141, 142, 143, 144, 145, 241, 242, 243, 244, and 245 from among the first additional view images and the second additional view images may be predicted with reference to key pictures 142, 144, 242, and 244 having the same view.

Since first additional view key pictures 141, 142, 143, 144, and 145 are predicted with reference to base view key pictures 41, 42, 43, 44, and 45, and second additional view key pictures 241, 242, 243, 244, and 245, which respectively have the same POC order, the first additional view key pictures 141, 142, 143, 144, and 145 are B-picture type images. In addition, first additional view key pictures 142 and 144 may predicted with reference to other first additional view key pictures 143 and 145 as well as base view key pictures 42 and 44.

Since some key pictures 241, 242, and 244 of second additional view key pictures 241, 242, 243, 244, and 245 are predicted with reference to only base view images 41, 42, and 44 having the same POC order, the key pictures 241, 242, and 244 are P-picture type images. However, second additional view key pictures 243 and 245 are predicted with reference to other second additional view key pictures 242 and 244 as well as base view images 43 and 45 having the same POC order, the second additional view key pictures 243 and 245 are B-picture type images.

A restoration process of key pictures 143, 145, 243, and 245 that are predicted with reference to the key pictures 142, 144, 242, and 244 of the same view from among the first additional view images and the second additional view images is different from a restoration process of a general multi-view video prediction structure 30. When the key pictures 142, 144, 242, and 244 of the same view, which are reference images for the key pictures 143, 145, 243, and 245, are restored, the key pictures 143, 145, 243, and 245 may be restored with reference to the key pictures 142, 144, 242, and 244 of the same view.

First, base view images may be restored via inter motion compensation.

After a reference image of a base view and a reference image of a second additional view are restored, the second additional view image may be restored by using the restored reference images. In particular, after the second additional view key picture 242 that is a reference image of the second additional view key picture 243, the second additional view key picture 243 may be restored via inter-view disparity compensation referring to the base view key picture 43 and motion compensation referring to the second additional view key picture 242. Likewise, after the second additional view key picture 244 that is a reference image of the second additional view key picture 245 is restored, the second additional view key picture 245 may be restored via inter-view disparity compensation referring to the base view key picture 45 and motion compensation referring to the second additional view key picture 244.

After a base view reference image, a second additional view reference image, and a first additional view reference image are restored, the first additional view image may be restored by using the restored reference images. In particular, after the first additional view key picture 142 that is a reference image of the first additional view key picture 143 is restored, the first additional view key picture 143 may be restored via inter-view disparity compensation referring to the base view key picture 43 and the second additional view key picture 243 and motion compensation referring to the first additional view key picture 142. Likewise, after the first additional view key picture 144 that is a reference image of the first additional view key picture 145 is restored, the first additional view key picture 145 may be restored via inter-view disparity compensation referring to the base view key picture 45 and the second additional view key picture 245 and motion compensation referring to the first additional view key picture 144.

Hereinafter, inter prediction of an additional view key picture of an enhancement layer according to various exemplary embodiments will be described with reference to FIGS. 4A through 8B. FIGS. 4A through 8B show inter prediction of Kth additional view images, that is, additional view images about additional views that are selected from among a plurality of additional views. Although inter-view prediction is not shown in FIGS. 4A through 8B, inter-view prediction and inter-view disparity compensation referring to base view images or other additional view images are performed, as described above with reference to the multi-view video prediction structure 40.

Figure 4B:
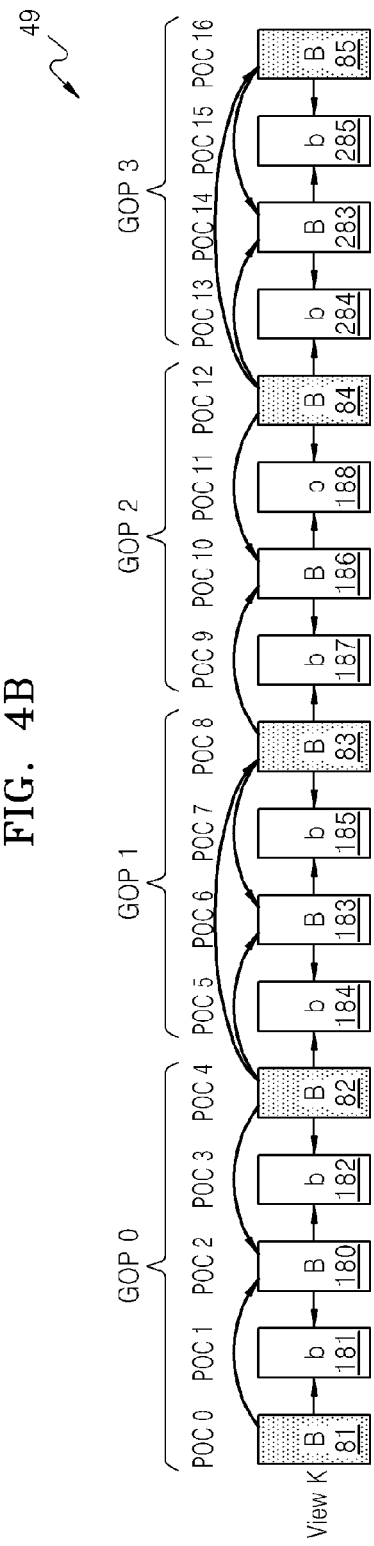
FIG. 4B shows an inter prediction structure of an enhancement layer for additional view images of the multi-view video prediction structure of FIG. 4A, according to another exemplary embodiment.

FIG. 4B shows an inter prediction structure 49 of an enhancement layer for additional view images of the multi-view video prediction structure 40 of FIG. 4A, according to another exemplary embodiment.

According to the inter prediction structure 49 of an enhancement layer, when inter prediction is performed on additional view images 81, 82, 83, 84, 85, 180, 181, 182, 183, 184, 185, 186, 187, 188, 283, 284, and 285, and the additional view key pictures 81, 82, 83, 84, and 85 are sequentially arranged as $0^{th}$, $1^{st}$, $2^{nd}$, $3^{rd}$, and $4^{th}$ key pictures, (even number)$^{th}$ key pictures 83 and 85 are predicted with reference to key pictures 82 and 84 that precede the key pictures 83 and 85.

In an encoding process for restoring and reproducing images that are prediction-encoded, only after the additional view key pictures 82 and 84, which are reference images for the additional view key pictures and 83 and 85, are restored, the additional view key pictures and 83 and 85 may be restored via motion compensation referring to the additional view key pictures 82 and 84. For convenience of description, the additional view key pictures and 83 and 85 are each referred to as a 'current' additional view key picture, and the additional view key pictures 82 and 84 preceding the additional view key pictures and 83 and 85 in the POC order are each referred to as a 'previous' additional view key picture.

When a previous additional view key picture 82 is not restored, if a restoration request or a reproduction request for a current additional view key picture 83 is generated, for example, if a random access to the current additional view key picture 83 is generated, the multi-view video prediction restoring apparatus 20 may restore the current additional view key picture 83 by using a base view image having the same POC order as the current additional view key picture 83 and a depth map of the current additional view key picture 83.

However, according to the inter prediction structure 49 of the enhancement layer described with reference to FIG. 4A, the B-picture type image 183 or the b-picture type images 184 and 185, which belong to the same GOP1 as the current additional view key picture 83, may directly or indirectly refer to the restoration result of a previous additional view key picture 52. Thus, when a random access to the current additional view key picture 83 is generated and the previous additional view key picture 52 is not restored, motion compensation that refers to the previous additional view key picture 52 for the B-picture type image 183 or the b-picture type images 184 and 185 may not be performed. Thus, in this case, the B-picture type image 183 or the b-picture type images 184 and 185 may be restored by using each depth map and the base view image. The B-picture type image 186 or the b-picture type images 187 and 188, which belong GOP2, may be restored with reference to the restored current additional view key picture 83.

Figure 5:
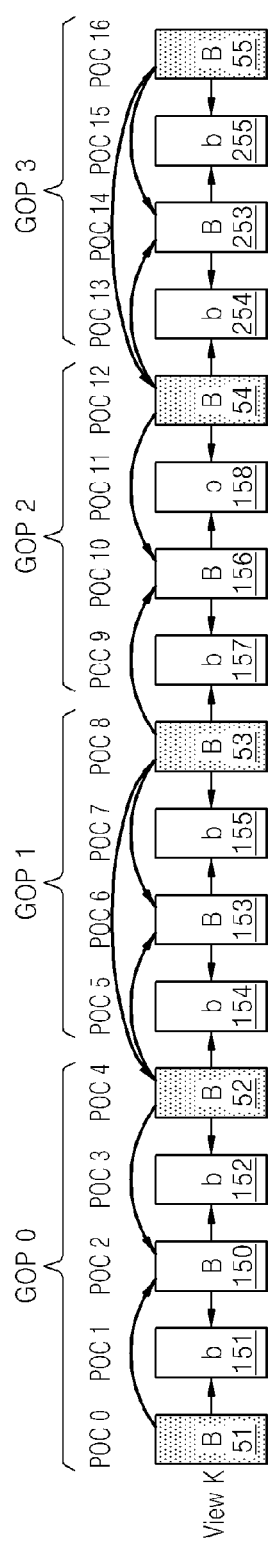
FIG. 5 shows an inter prediction structure of an enhancement layer for additional view images from among multi-video prediction structures, according to an exemplary embodiment.

FIG. 5 shows an inter prediction structure 50 of an enhancement layer for additional view images from among multi-video prediction structures, according to an exemplary embodiment.

According to the inter prediction structure 50 of the enhancement layer, when inter prediction is performed on additional view images 51, 52, 53, 54, 55, 150, 151, 152, 153, 154, 155, 156, 157, 158, 253, 254, and 255, and additional view key pictures 51, 52, 53, 54, and 55 are sequentially arranged as $0^{th}$, $1^{st}$, $2^{nd}$, $3^{rd}$, and $4^{th}$ key pictures, (odd number)$^{th}$ key pictures 52 and 54 are predicted with reference to key pictures 53 and 55 subsequent to the key pictures 52 and 54.

In a decoding process for restoring and reproducing images that are prediction-encoded, only after the additional view key pictures 53 and 55, which are reference images for the additional view key pictures 52 and 54, are restored, the additional view key pictures 52 and 54 may be restored via motion compensation referring to the additional view key pictures 53 and 55. For convenience of description, the additional view key pictures 52 and 54 are each referred to as a 'current' additional view key picture and the additional view key pictures 53 and 55 subsequent to the additional view key pictures 52 and 54 in the POC order are each referred to a 'next' additional view key picture.

Thus, when a next additional view key picture 53 is not restored, if a restoration request or a reproduction request for a current additional view key picture 52 is generated, for example, if an random access to the current additional view key picture 52 is generated, two methods of restoring the current additional view key picture 52 will be described as follows.

In a first method, when a restoration request for the current additional view key picture 52 is generated before the next additional view key picture 53 is restored, since the next additional view key picture 53 is not yet restored, the multi-view video prediction restoring apparatus 20 may restore the current additional view key picture 52 by using a base view image having the same POC order as the current additional view key picture 52 from among base view images and a depth map of the current additional view key picture 52.

In a second method, when a restoration request for the current additional view key picture 52 is generated before the next additional view key picture 53 is restored, the multi-view video prediction restoring apparatus 20 may delay restoration of the current additional view key picture 52 until the next additional view key picture 53 is restored according to a restoration order of the additional view images. After the next additional view key picture 53 is restored according to a restoration order of the additional view images, the multi-view video prediction restoring apparatus 20 may restore the current additional view key picture 52 with reference to the restored next additional view key picture 53. In this case, the multi-view video prediction restoring apparatus 20 may store encoding data of images, which are not yet restored, from among images of GOP0 and GOP1 in addition to the current additional view key picture 52 in a buffer until the next additional view key picture 53 is restored. When the next additional view key picture 53 is restored, the images stored in the buffer may be restored by using the next additional view key picture 53 and then restored images 52, 53, 150, 151, 152, 153, 154, and 155 may be rearranged according to a POC order.

Unlike the restoring process of the key pictures 52 and 54, when receiving a restoration request or a reproducing request for the key pictures 53 and 55 that do not refer to different key pictures, the multi-view video prediction restoring apparatus 20 may immediately restore the key pictures 53 and 55 via disparity compensation without waiting for a restoration order of other key pictures.

However, according to the inter prediction structure 50 of the enhancement layer described with reference to FIG. 5, since a b-picture type image 157 or B-picture type image 156, which follows the key picture 53, may directly or indirectly refer to the restoration result of the key picture 54 as well as the key picture 53, although the key picture 53 is restored, only after the key picture 54 is restored, the b-picture type image 157 or the B-picture type image 156 may be restored. In this case, since the key picture 54 is completely restored after the key picture 55 is restored, the multi-view video prediction restoring apparatus 20 may also restore the images 156, 157, and 158 of GOP2 when the images 253, 254, and 255 of GOP3 are capable of being restored. Thus, restoration of the images 156, 157, and 158 of GOP2 may be delayed by as much as a single GOP.

FIG. 6 shows an inter prediction structure 60 of an enhancement layer for additional view images from among multi-view video prediction structures, according to another exemplary embodiment.

According to the inter prediction structure 60 of the enhancement layer, when inter prediction is performed on additional view images 61, 62, 63, 64, 65, 160, 161, 162, 163, 164, 165, 166, 167, 168, 263, 264, and 265, and additional view key pictures 61, 62, 63, 64, and 65 are sequentially arranged as $0^{th}$, $1^{st}$, $2^{nd}$, $3^{rd}$, and $4^{th}$ key pictures, (odd number)$^{th}$ key pictures 62 and 64 are predicted with reference to key pictures 63 and 65 subsequent to the key pictures 62 and 64.

The inter prediction structure 60 of the enhancement layer described with reference to FIG. 6 is the same as the inter prediction structure 50 of the enhancement layer described with reference to FIG. 5 in that the additional view key pictures 62 and 64 refer to additional view key pictures 63 and 65 that are subsequent in the POC order.

However, comparing the inter prediction structure 50 of the enhancement layer of FIG. 5 and the inter prediction structure 60 of the enhancement layer of FIG. 6, reference images of images 160, 162, 166, and 168 from among b-picture type and B-picture type images 160, 161, 162, 163, 164, 165, 166, 167, 168, 263, 264, and 265 are changed. That is, in the inter prediction structure 60 of the enhancement layer of FIG. 6, current additional view key pictures 62 and 64 are excluded from the reference images of the b-picture type and B-picture type images 160, 162, 166, and 168.

Thus, unlike in the inter prediction structure 50 of the enhancement layer described with reference to FIG. 5, according to the inter prediction structure 60 of the enhancement layer of FIG. 6, the b-picture type and B-picture type images 160 and 162 may be restored with reference to the restored additional view key picture 61 without waiting for the restoring result of the additional view key picture 62. Similarly, the b-picture type and B-picture type images 166 and 168 may be restored with reference to the restored additional view key picture 63 without waiting for the restoring result of the additional view key picture 64.

Thus, according to the inter prediction structure 60 of the enhancement layer of FIG. 6, despite the key pictures 62 and 64 that are positioned just after the b-picture type and B-picture type images 160, 162, 166, and 168 according to a POC order, if the key pictures 62 and 64 refer to the key pictures 63 and 65 subsequent in the POC order, the b-picture type and B-picture type images 160, 162, 166, and 168 do not refer to the key pictures 62 and 64.

FIG. 7 shows an inter prediction structure 70 of an enhancement layer for additional view images from among multi-video prediction structures, according to another exemplary embodiment.

According to the inter prediction structure 70 of the enhancement layer, inter prediction is performed on additional view images 71, 72, 73, 74, 75, 170, 171, 172, 173, 174, 175, 176, 177, 178, 273, 274, and 275, and additional view key pictures 71, 72, 73, 74, and 75 are sequentially arranged as $0^{th}$, $1^{st}$, $2^{nd}$, $3^{rd}$, and $4^{th}$ key pictures, (odd number)$^{th}$ key pictures 72 and 74 are predicted with reference to key pictures 71 and 73 that precede the key pictures 72 and 74.

The inter prediction structure 70 of the enhancement layer of FIG. 7 is different from the inter prediction structures 50 and 60 of the enhancement layer described with reference to FIGS. 5 and 6 in that additional view key pictures 72 and 74 refer to the additional view key pictures 71 and 73 preceding in the POC order, in the inter prediction structure 70 of the enhancement layer.

However, according to the inter prediction structure 70 of the enhancement layer of FIG. 7, additional view key pictures 72 and 74 referring to the different key pictures 71 and 73 are excluded from reference images of b-picture type and B-picture type images 173, 174, 273, and 274.

Despite the key pictures 72 and 74 that are positioned just before the b-picture type and B-picture type images 173, 174, 273, and 274 according to a POC order, if the key pictures 72 and 74 refer to the key pictures 71 and 73 preceding in the POC order, the b-picture type and B-picture type images 173, 174, 273, and 274 do not refer to the key pictures 72 and 74.

Figure 8A:
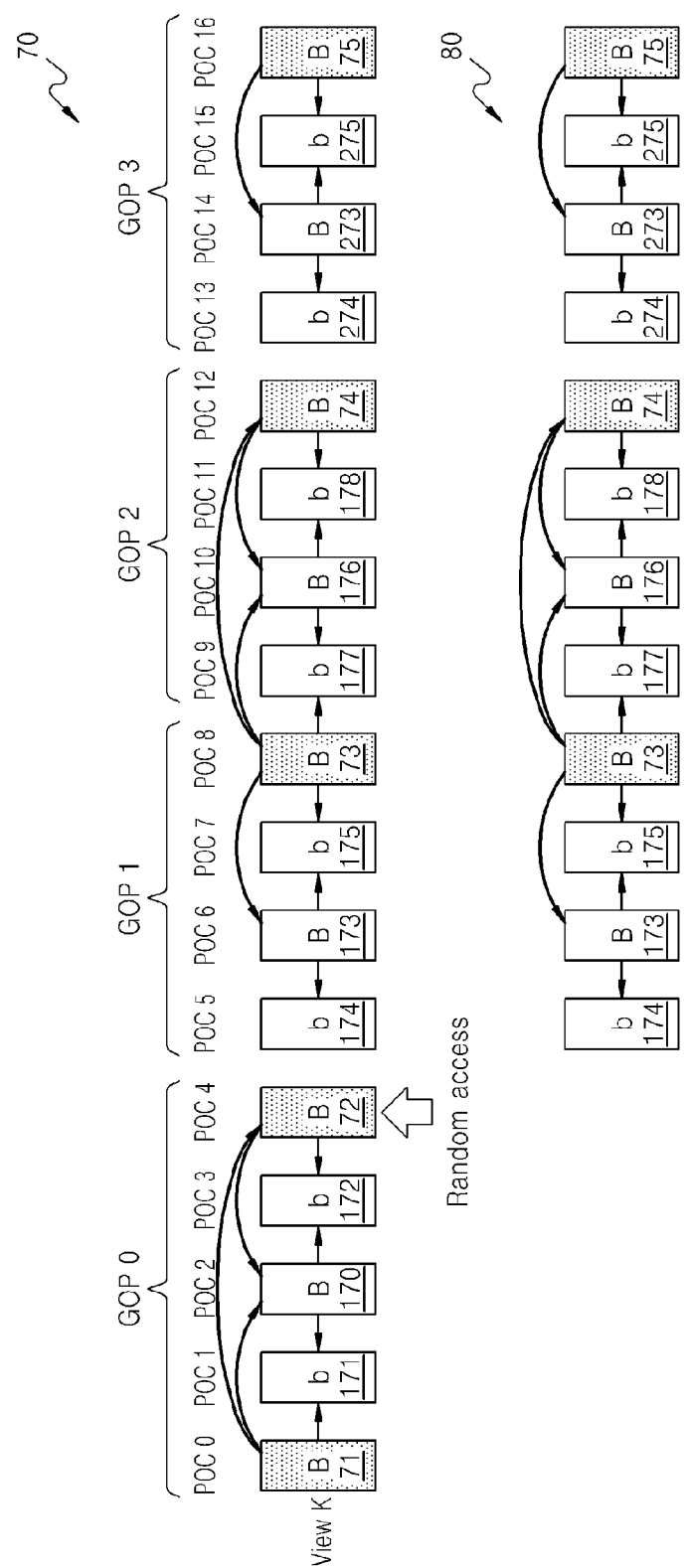
FIGS. 8A and 8B show restoring results when a random access is generated in an inter prediction structure of an enhancement layer of FIG. 7, according to an exemplary embodiment.
Figure 8B:
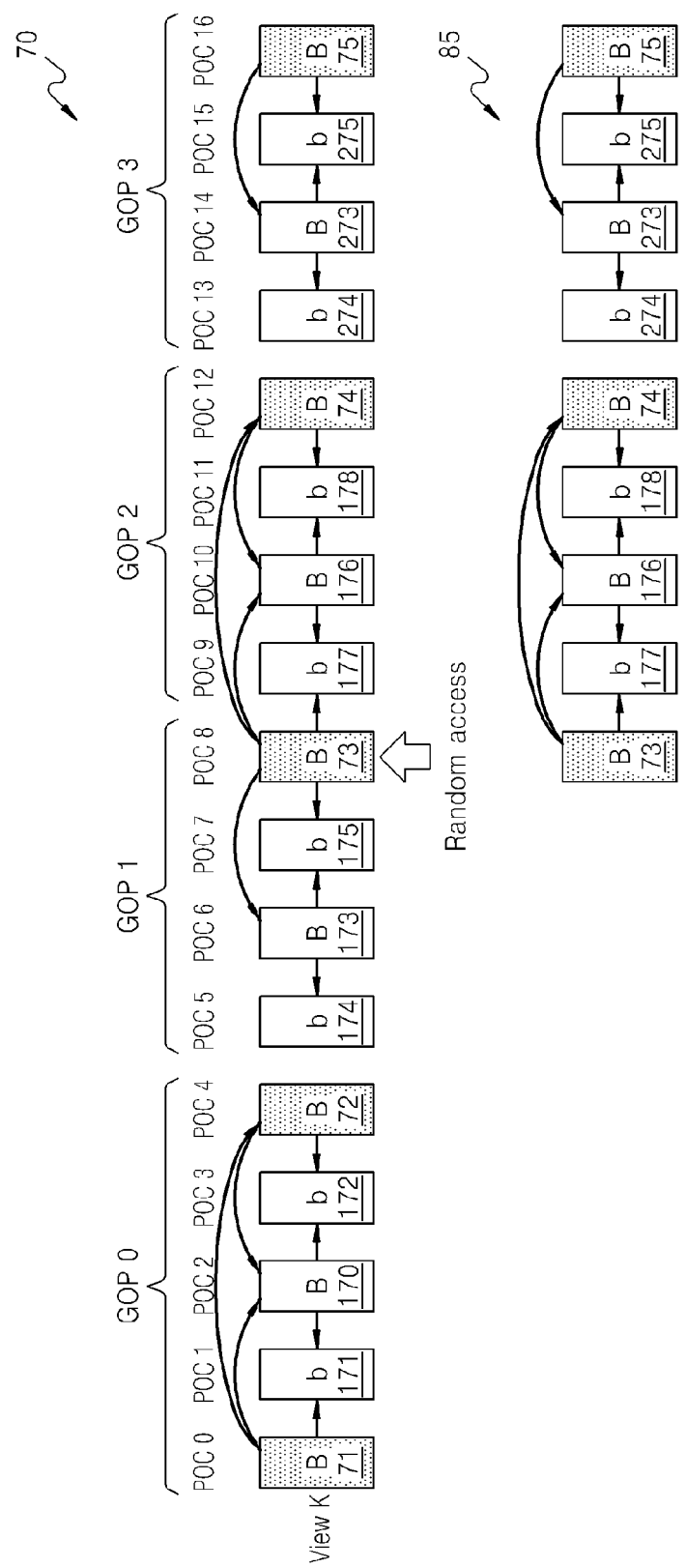

FIGS. 8A and 8B show restoring results when a random access is generated in the inter prediction structure 70 of an enhancement layer of FIG. 7, according to an exemplary embodiment.

Unlike in the inter prediction structures 50 and 60 of the enhancement layer described with reference to FIGS. 5 and 6, according to the inter prediction structure 70 of the enhancement layer of FIG. 7, when a random access to a current key image is generated, a key picture prior to a current key image is not restored in principle.

Thus, as shown in FIG. 8A, when a random access to a key picture 72 referring to a key picture 71 is generated, since the key picture 71 is not restored, the key picture 72 is not restored. Thus, when a random access to the key picture 72 referring to the previous key picture 71 is generated, the multi-view video prediction restoring apparatus 20 may skip restoration of the key picture 72 and may restore additional view images 73, 173, 174, 175, 74, 176, 177, 178, 75, 273, 274, and 275 of GOP1, GOP2, and GOP3. The restored images 174, 173, 175, 73, 177, 176, 178, 74, 274, 273, 275, and 75 may be rearranged (80) and may be reproduced according to a POC order. Thus, as a result of the random access of the key picture 72, when restored images are reproduced, the key picture 72 may be processed as loss.

For another example, a depth map may be used.

As shown in FIG. 8A, when a random access to the key picture 72 referring to the key picture 71 is generated, the additional view key picture 72 may be restored by using a base view image having the same POC order as the additional view key picture 72 and a depth map.

As shown in FIG. 8B, when a random access to the key image 73 is generated, since the restoring result of different additional view key pictures is unnecessary, the key image 73 may be immediately restored and additional view images 74, 176, 177, 178, 75, 273, 274, and 275 of GOP2 and GOP3 may be restored. The restored images 73, 177, 176, 178, 74, 274, 273, 275, and 75 may be rearranged (85) and reproduced according to a POC order.

The encoding and restoring is not limited the exemplary embodiments shown in FIGS. 4A through 8B. The multi-view video prediction apparatus 10 and the multi-view video prediction restoring apparatus 20 may select forward prediction or backward prediction for inter prediction (or motion compensation) of enhancement layer. For example, an (odd number)$^{th}$ key picture may be predicted (or restored) with reference to an (even number)$^{th}$ key picture from among additional view key pictures or an (even number)$^{th}$ key picture may be predicted (restored) with reference to an (odd number)$^{th}$ key picture.

As shown in FIGS. 4A and 4B, a POC order of a reference key picture precedes a POC order of a current additional view key picture, a random access to the current additional view key picture is generated, the multi-view video prediction restoring apparatus 20 may restore the current additional view key picture by using a depth map of the current additional view key picture and a base view image.

Like in FIGS. 5 and 6, when a POC order of a reference key picture is subsequent to a POC order of the current additional view key picture, the multi-view video prediction restoring apparatus 20 delays restoration of the current additional view key picture until the reference key image is restored. Even after the reference key image is restored, the current additional view key picture may be restored. For another example, if the reference key image is not restored, the multi-view video prediction restoring apparatus 20 may skip of motion compensation of the current additional view key picture and may restore the current additional view key picture by using the depth map of the current additional view key picture and the base view image.

Like in FIGS. 7, 8A, and 8B, although a POC order of a reference key picture precedes a POC order of the current additional view key picture, when a random access request for the current additional view key picture is generated, since the reference key image is not restored, the multi-view video prediction restoring apparatus 20 may skip restoration of the current additional view key picture and may restore images having a next POC order.

As shown in FIGS. 6, 7, 8A, and 8B, with regard to some of the b-picture type or B-picture type images that are not key images, a key image that is predicted with different key images of the same view may be exclude from reference images.

However, as shown in FIGS. 4A, 4B, and 5, to restore the current additional view key picture that is predicted with reference to different key images of the same view, when a reference key image is restored by using the base view key picture and the depth map, b-picture type or B-picture type additional view images that are not key images may be restored with reference to the current additional view key picture.

FIG. 9 is a flowchart of a multi-view video prediction method according to an exemplary embodiment.

In operation 91, inter prediction between base view images is performed on to generate a base layer image stream including encoded data of base view key pictures of I-picture type images and encoded data of residual values of I-picture base view key pictures.

In operation 92, (i) inter-view prediction for predicting additional view images with reference to base view images, (ii) inter prediction for predicting different additional view key pictures with reference to the additional view key picture from among additional view images, and (iii) inter prediction for predicting additional view images except for the additional view key picture with reference to the additional view images may be performed. An enhancement layer image stream including residual values of the additional view images generated via (i) inter-view prediction, (ii) inter prediction of additional view key pictures, and inter prediction of additional view images except for a key picture may be generated.

In operation 93, inter prediction of the current additional view key picture may be performed with reference to an additional view key picture that is restored prior to restoration of the current additional view key picture, from among additional view key pictures. As another example, inter prediction of the current additional view key picture may be performed with reference to the additional view key picture that is to be restored after the current additional view key picture is restored, from among additional view key pictures.

According to an exemplary embodiment, a depth map indicating an inter-view depth between a base view images and an additional view image, which have the same scene, from among base view images and additional view images, may be generated. The generated depth maps may be transmitted together with the base layer image stream and the enhancement layer image stream.

FIG. 10 is a flowchart of a multi-view video prediction restoring method according to an exemplary embodiment.

In operation 101, a base layer image stream and an enhancement layer image stream are received.

In operation 103, an I-picture type base view key picture of the base layer image stream is restored and motion compensation of base view images is performed with reference to the base view key picture to restore the base view images.

In operation 105, when the additional view key picture of the enhancement layer image stream is accessed, at least one of disparity compensation referring to the restored base view key pictures and motion compensation referring to different additional view key pictures of the enhancement layer stream may be performed to restore the additional view key picture.

In operation 107, at least one of disparity compensation referring to the restored base view images and motion compensation referring to an additional view of the enhancement layer stream, which is first restored, may be performed on additional view images except for additional view key pictures of the enhancement layer image stream to restore an additional view image except for the additional view key picture.

In operation 101, from among the base view images and the additional view images, a depth map indicating an inter-view depth between a base view image and an additional view, which have the same scene, may be further received.

To restore a key picture, access for a key picture may be generated.

For example, in operation 105, when the current additional view key picture, which is predicted with reference to the additional view key picture restored prior to restoration of the current additional view key picture from among the additional view key pictures, is accessed, the current additional view key picture may be restored by using a depth map and a base view image corresponding to the current additional view key picture.

As another example, in operation 105, when the current additional view key picture, which is predicted with reference to the additional view key picture restored prior to the restoration of the current additional view key picture from among the additional view key pictures, is accessed, restoration of the current additional view key picture may be skipped and a next additional view key picture of the current additional view key picture may be restored.

For example, in operation 105, when the current additional view key picture, which is predicted with reference to an additional view key picture to be restored after the current additional view key picture is restored, is accessed, the current additional view key picture may be restored by using a depth map and a base view image corresponding to the current additional view key picture.

As another example, in operation 105, when the current additional view key picture, which is predicted with reference to the additional view key picture to be restored after the current additional view key picture is restored, is accessed, restoration of the current additional view key picture may be delayed. The current additional view key picture may be restored by using a reference image that is restored after the additional view key picture as a reference image is restored.

For example, in operation 105, when the current additional view key picture, which does not refer to a different additional view key picture from among additional view key pictures, is accessed, the current additional view key picture may be restored by using a base view image corresponding to the current additional view key picture.

As another example, in operation 105, when the current additional view key picture, which does not refer to a different additional view key picture from among additional view key pictures, is accessed, the current additional view key picture may be restored by using a depth map and a base view image corresponding to the current additional view key picture.

A multi-view video encoding terminal for performing the multi-view video prediction method of FIG. 9 may include the multi-view video prediction apparatus 10. The multi-view video encoding terminal including the multi-view video prediction apparatus 10 may perform inter prediction, inter prediction, inter-view prediction, transformation, and quantization for each respective image block to generate samples and may perform entropy encoding on the samples to output the samples in the form of a bitstream. As a video encoding result of the multi-view video encoding terminal including the multi-view video prediction apparatus 10, that is, the multi-view video prediction apparatus 10 may cooperatively interact with an internal video encoding processor installed in the multi-view video encoding terminal or an external video encoding processor to output the base layer image stream and the enhancement layer image stream, and thus, a video encoding process including transformation may be performed. According to an exemplary embodiment, the internal video encoding processor of the multi-view video encoding terminal may be embodied by adding a video encoding processing module to a video encoding device, a central operating device, or a graphic operating device as well as to a separate processor, which performs a basic video encoding operation.

In addition, a video restoring process is required to generate a reference image during a video prediction process. Thus, the multi-view video encoding terminal may further include the multi-view video prediction restoring apparatus 20 for performing the multi-view video prediction restoring method of FIG. 10. The multi-view video encoding terminal including the multi-view video prediction restoring apparatus 20 may perform decoding on a datastream that is generated via inter prediction, inter-view prediction, intra prediction, transformation, and quantization for each respective base layer and enhancement layer. That is, with regard to the base layer and the enhancement layer, inverse quantization, inverse transformation, intra prediction, and motion compensation (or inter motion compensation or inter-view disparity compensation) may be performed on each respective image block to restore the samples of the base view images and the additional view images. In order for the multi-view video encoding terminal to output the restored reference image, the multi-view video prediction restoring apparatus 20 may cooperatively interact with an internal video encoding processor installed in the multi-view video encoding terminal or an external video encoding processor, and thus, a video restoration operation including inverse quantization, inverse transformation, and prediction/compensation may be performed. According to an exemplary embodiment, the internal video encoding processor of the multi-view video encoding terminal may be embodied by adding a video decoding processing module to a multi-view video encoding terminal, a central operating device, or a graphic operating device as well as to a separate processor, which performs a basic video restoring operation.

A multi-view video restoring terminal for performing the multi-view video prediction restoring method of FIG. 10 may include the multi-view video prediction restoring apparatus 20. The multi-view video restoring terminal including the multi-view video prediction restoring apparatus 20 may decode the received base layer image stream and enhancement layer image stream. That is, inverse quantization, inverse transformation, intra prediction, and motion compensation (or inter motion compensation or inter-view disparity compensation) may be performed on the base layer image stream and the enhancement layer image stream for each respective image block to restore samples of base view images from the base layer image stream and to restore samples of additional view images from the enhancement layer image stream. To output a restoration image generated as a decoding result of the multi-view video restoring terminal, the multi-view video prediction restoring apparatus 20 may cooperatively interact with an internal video encoding processor installed in the multi-view video restoring terminal or an external video decoding processor, and thus, a video restoring operation including inverse quantization, inverse transformation, and prediction/restoration may be performed. The internal video decoding processor of the multi-view video restoring terminal may be embodied by adding a video decoding processing module to a multi-view video restoring terminal, a central operating device, or a graphic operating device, as well as to a separate processor, which performs a basic video restoring operation.

As described above, in the multi-view video prediction apparatus 10 and the multi-view video prediction restoring apparatus 20, blocks obtained by splitting video data is split into coding units according to a tree structure, and coding units, prediction units, and transformation units are used for inter-view prediction or inter prediction for a coding unit. Hereinafter, with reference to FIGS. 11 through 23, a method and apparatus for encoding a video and a method and apparatus for decoding a video, based on a coding unit and a transformation unit according to a tree structure will be described.

In principle, during encoding/decoding for multi-view video, encoding/decoding processes for a base layer and encoding/decoding processes for an enhancement layer are separately performed. That is, when inter-view prediction is performed on a multi-view video, encoding/decoding results of a single-view video are cross referenced, but separate encoding/decoding processes are performed for respective single-view videos.

For convenience of description, since a video encoding process and a video decoding process based on a coding unit according to a tree structure, which will be described with reference to FIGS. 11 through 23, are performed on a single-view video, only inter prediction and motion compensation will be described. However, as described with reference to FIGS. 1 through 10, inter-view prediction between base view images and additional view images and inter-view disparity compensation are performed.

Figure 11:
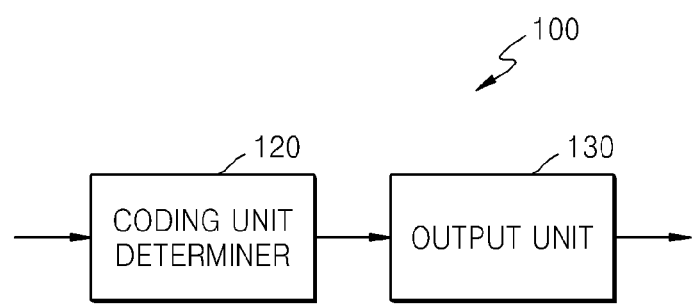
FIG. 11 is a block diagram of a video encoding apparatus according to an exemplary embodiment.

When the multi-view video prediction apparatus 10 encodes a multi-view video based on a coding unit according to a tree structure, to encode a video for each respective single-video video, the multi-view video prediction apparatus 10 includes video encoding apparatuses 100 of FIG. 11 for each of views of the multi-view video to encode a video such that each video encoding apparatus 100 may be controlled to encode an assigned single-view video. In addition, the multi-view video prediction apparatus 10 may perform inter-view prediction by using the encoding results of separate single-views of each video encoding apparatus 100. Thus, the multi-view video prediction apparatus 10 may generate a base layer image stream and an enhancement layer image stream, in which the encoding results for respective views are recorded, for each respective hierarchy.

Figure 12:
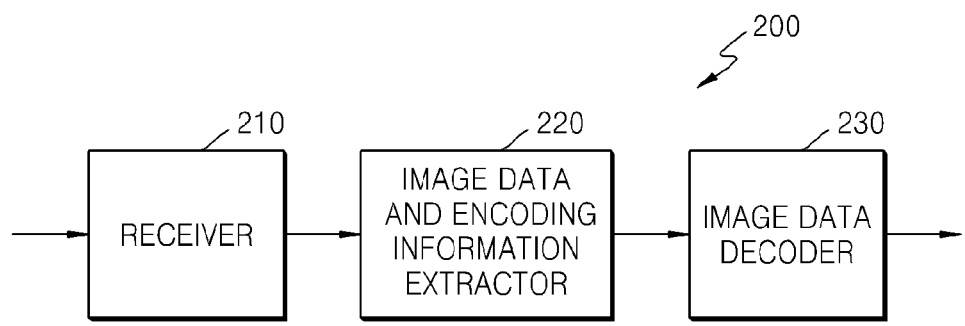
FIG. 12 is a block diagram of a video decoding apparatus according to an exemplary embodiment.

Similarly, when the multi-view video prediction restoring apparatus 20 decodes a multi-view video based on a coding unit according to a tree structure, to decode the received base layer image stream and enhancement layer image stream for each respective layer, the multi-view video prediction restoring apparatus 20 may include video decoding apparatuses 200 of FIG. 12 for each of views of the multi-view video and the video decoding apparatuses 200 may be controlled to perform decoding on single-view videos that are respectively assigned to the video decoding apparatuses 200. In addition, the multi-view video prediction restoring apparatus 20 may perform inter-view disparity compensation by using the decoding results of separate single-views of the multi-view video prediction restoring apparatuses 20. Thus, the multi-view video prediction restoring apparatus 20 may generate base view images and additional view images, which are restored for respective layers.

FIG. 11 is a block diagram of a video encoding apparatus 100 based on a coding unit according to a tree structure, according to an exemplary embodiment.

The video encoding apparatus 100 for performing video prediction based on a coding unit according to a tree structure includes a coding determiner 120 and an output unit 130. Hereinafter, for convenience of description, the video encoding apparatus 100 for performing video prediction based on a coding unit according to a tree structure is referred to as the video encoding apparatus 100.

The coding determiner 120 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2.

A coding unit according to an exemplary embodiment may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of hierarchical divisions of a height and a width of the maximum coding unit may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split into regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of times a maximum coding unit is split to obtain a minimum coding unit. A first maximum depth according to an exemplary embodiment may denote the total number of times the maximum coding unit is split to obtain the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to a method of orthogonal transformation or integer transformation.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may select a size or shape of a data unit for encoding the image data. To encode the image data, operations, such as prediction encoding, transformation, and entropy encoding, are performed, and at this time, the same data unit may be used for all operations or different data units may be used for each operation.

For example, the video encoding apparatus 100 may select a coding unit for encoding the image data and a data unit different from the coding unit to perform the prediction encoding on the image data in the coding unit.

To perform prediction encoding on the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. The partition is a data unit obtained by dividing the prediction unit of the coding unit and the prediction unit may be a partition having the same size as the coding unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a transformation unit that is different from the coding unit. To perform the transformation in the coding unit, the transformation may be performed based on a data unit having a size smaller than or equal to the coding unit. For example, the transformation unit for the transformation may include a transformation unit for an intra mode and a data unit for an inter mode.

Similarly to the coding unit according to the tree structure according to the present exemplary embodiment, the transformation unit in the coding unit may be recursively split into smaller sized regions and residual data in the coding unit may be divided according to the transformation having the tree structure according to transformation depths.

According to an exemplary embodiment, a transformation depth indicating the number of times splitting is performed to reach the transformation unit by splitting the height and width of the coding unit may also be set in the transformation unit. For example, when the size of a transformation unit of a current coding unit is 2N×2N, a transformation depth may be set to 0. When the size of a transformation unit is N×N, the transformation depth may be set to 1. In addition, when the size of the transformation unit is N/2× N/2, the transformation depth may be set to 2. That is, the transformation unit according to the tree structure may also be set according to the transformation depth.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units and a prediction unit/partition according to a tree structure in a maximum coding unit, and a method of determining a transformation unit, according to exemplary embodiments, will be described in detail with reference to FIGS. 13 through 23.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to the coded depth may include information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations because the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit having a maximum size, which is included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Also, information about a maximum size of the coding unit defined according to pictures, slices, or GOPs, and information about a maximum depth may be inserted into a header of a bitstream, a SPS (Sequence Parameter Set) or a picture parameter set (PPS).

In addition, information about a maximum size of a transformation unit and information about a minimum size of a transformation, which are acceptable for a current video may also be output via a header of a bitstream, a SPS or a PPS. The output unit 130 may encode and output reference information, prediction information, single-direction prediction information, and information about a slice type including a fourth slice type, which are related to prediction described with reference to FIGS. 1 through 6.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum value 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The multi-view video prediction apparatus 10 described with reference to FIG. 1 may include video encoding apparatuses 100 for each of the number of views to encode single-view images for respective views of a multi-view video. For example, the base layer encoder 12 may include a single video encoding apparatus 100 and the enhancement layer encoder 14 may include the video encoding apparatus 100 for each of the number of additional views.

When the video encoding apparatus 100 encodes base view images, the coding determiner 120 may determine a prediction unit for inter prediction for each respective coding unit according to a tree structure for each maximum coding unit and may perform inter prediction for each respective prediction unit.

When the video encoding apparatus 100 encodes additional view images, the coding determiner 120 may also determine a prediction unit and a coding unit according to a tree structure for each maximum coding unit and may perform inter prediction for each respective prediction unit.

In particular, the video encoding apparatus 100 for the additional view images may predict the additional view key picture with reference to different key images of the same view, for inter prediction. The video encoding apparatus 100 may generate a depth map in which a depth difference between the additional view images and base view images having the same POC order as the additional view images is recorded.

For example, with regard to some of b-picture type or B-picture type images, which are not key pictures, key pictures that are predicted with reference to different key pictures of the same view may be excluded from reference images. As another example, b-picture type or B-picture type additional view images that are not key pictures may be predicted with reference to the current additional view key picture.

FIG. 12 is a block diagram of a video decoding apparatus 200 based on a coding unit according to a tree structure, according to an exemplary embodiment.

The video decoding apparatus 200 based on the coding unit according to the tree structure includes a receiver 210, an image data and encoding information extractor 220, and an image data decoder 230. Hereinafter, for convenience of description, the video decoding apparatus 200 using video prediction based on a coding unit according to a tree structure will be referred to as the video decoding apparatus 200.

Descriptions of various terms, such as a coding unit, a depth, a prediction unit, a transformation unit, and information about various encoding modes, for decoding operations of the video decoding apparatus 200 have been described above with reference to FIG. 11 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, a SPS, or a PPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit.

Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse transformation. Inverse transformation may be performed according to a method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read transformation unit information according to a tree structure for each coding unit to determine transform units for each coding unit and perform inverse transformation based on transformation units for each coding unit, for inverse transformation for each maximum coding unit. Via the inverse transformation, a pixel value of a spatial region of the coding unit may be restored.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. For each coding unit determined as described above, information about an encoding mode may be obtained to decode the current coding unit.

The multi-view video prediction apparatus 10 described with reference to FIG. 1 may include image data decoders 230 of the image decoding apparatus 200 for each of the number of views to generate reference images for inter prediction for respective views of a multi-view video. For example, the base layer encoder 12 may include a single image data decoder 230 and the enhancement layer encoder 14 may include video decoding apparatuses 200 by as many as the number of additional views.

In addition, the multi-view video prediction restoring apparatus 20 described with reference to FIG. 2 may include the video decoding apparatuses 200 for each of the number of views to decode the received base layer image stream and enhancement layer image stream to restore base view images and additional view images. For example, the base layer decoder 24 may include a single video decoding apparatus 200 and the enhancement layer decoder 26 may include video decoding apparatuses 200 for each of the number of additional views.

When a base layer image stream is received, the image data decoder 230 of the video decoding apparatus 200 may split samples of base view images that are extracted from the base layer image stream by the extractor 220 into coding units according to a tree structure of a maximum coding unit. The image data decoder 230 may perform motion compensation on respective prediction units for inter prediction for each respective coding unit according to a tree structure of the samples of the base view images, to restore the base view images.

When an enhancement layer image stream is received, the image data decoder 230 of the video decoding apparatus 200 may split samples of additional view images that are extracted from the enhancement layer image stream by the extractor 220 into coding units according to a tree structure of a maximum coding unit. The image data decoder 230 may perform motion compensation on respective prediction units for inter prediction of the samples of the additional view images to restore the additional view images.

When the image data decoder 230 for an additional view image restores the current additional view key picture, if an additional view key picture (reference key picture) that is a reference image of the current additional view key picture is not yet restored, the current additional view key picture may be restored by using a base view key picture having the same POC order as the current additional view key picture and a depth map of the current additional view key picture.

For example, even if a POC order of the reference key picture is earlier than a POC order of the current additional view key picture, if the current additional view key picture needs to be restored (for example, if an access request for the current additional view key picture is generated) when the reference key picture is not restored, the image data decoder 230 may restore the current additional view key picture by using the depth map of the current additional view key picture and a base view image.

For example, when the image data decoder 230 is capable of restoring the reference key picture by using the base view key picture and the depth map to restore the current additional view key picture that is predicted with reference to different key pictures of the same view, the image data decoder 230 may also restore b-picture type or B-picture type additional view images that are not key pictures with reference to the current additional view key picture.

However, when the reference key image of the b-picture type or B-picture type additional view images that are not key pictures is not restored, the additional view images may also be restored by using the depth map of the additional view images and the base view images.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of a coding unit is determined considering resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 13:
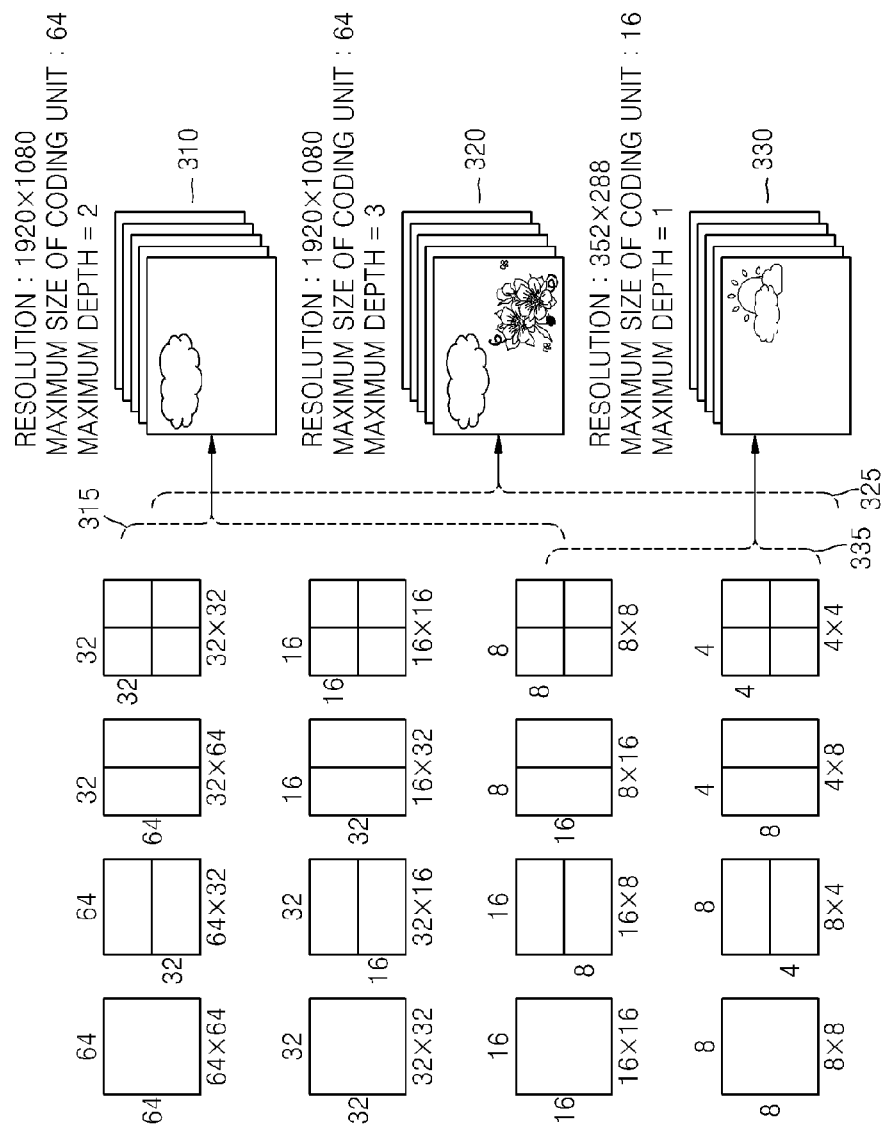
FIG. 13 is a diagram for describing a concept of coding units according to an exemplary embodiment.

FIG. 13 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 13 denotes a total number of splits from a maximum coding unit to a minimum decoding unit.

If a resolution is high or a data amount is large, a maximum size of a coding unit may be large to increase encoding efficiency and also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 14:
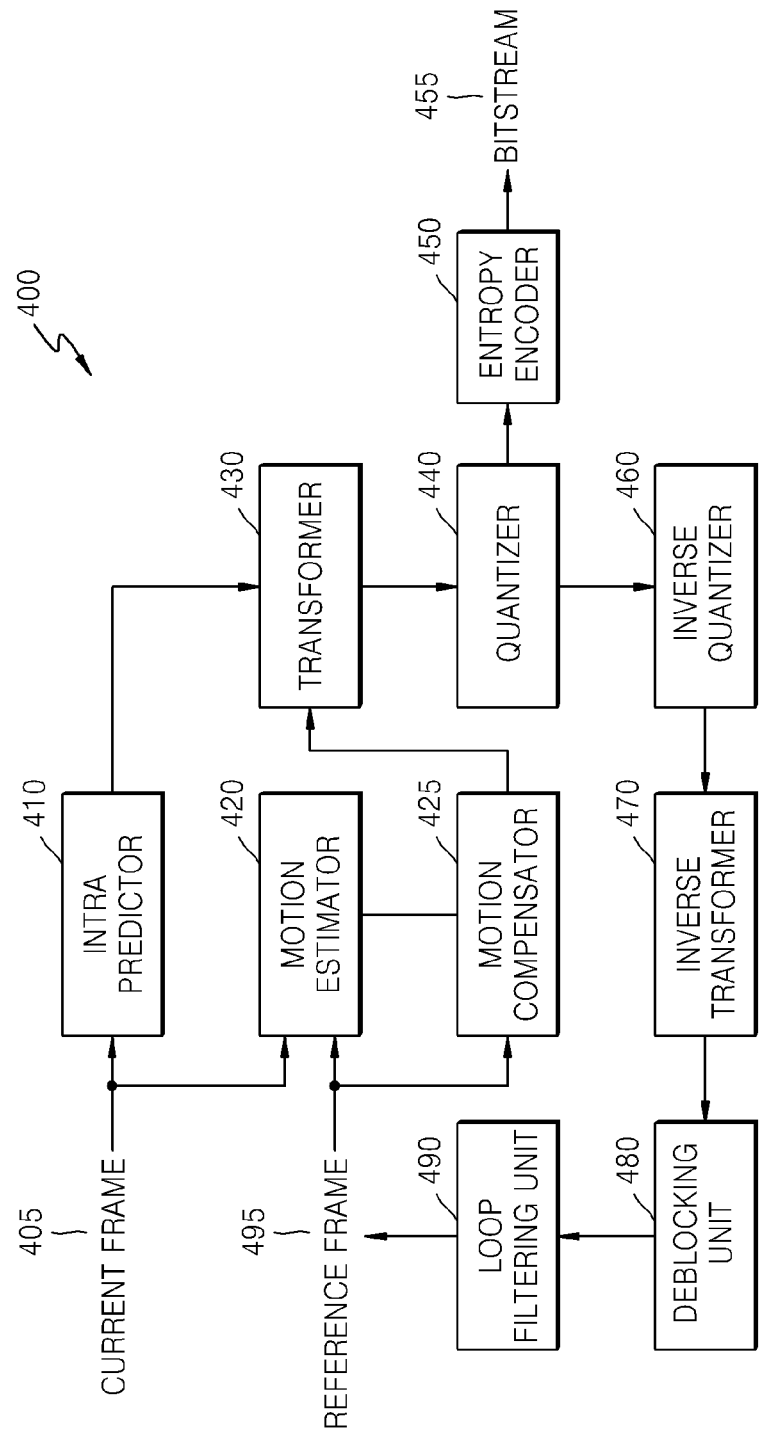
FIG. 14 is a block diagram of an image encoder based on coding units according to an exemplary embodiment.

FIG. 14 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as quantized transformation coefficients through a transformer 430 and a quantizer 440. The quantized transformation coefficients are restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficients may be output as a bitstream 455 through an entropy encoder 450.

For the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

If the image encoder 400 encodes additional view images in a multi-view video structure, when the motion estimator 420 determines a prediction unit for inter prediction for each coding unit according to a tree structure for a maximum coding unit and perform inter prediction for each prediction unit, additional view key pictures may be predicted with reference to different key images of the same view. In addition, the image encoder 400 may generate depth maps in which a depth difference between base view images having the same POC order as the additional view images is recorded.

In addition, the motion compensator 425 may perform motion compensation for each respective prediction unit for inter prediction to restore the additional view images. The restored images of the additional view images may be used as reference images for inter prediction of the additional view images. When the current additional view key picture is restored, if the additional view key picture (reference key image) that is a reference image of the current additional view key picture is not restored, the current additional view key picture may be restored by using the base view key picture having the same POC order as the current additional view key picture and the depth map of the current additional view key picture.

Figure 15:
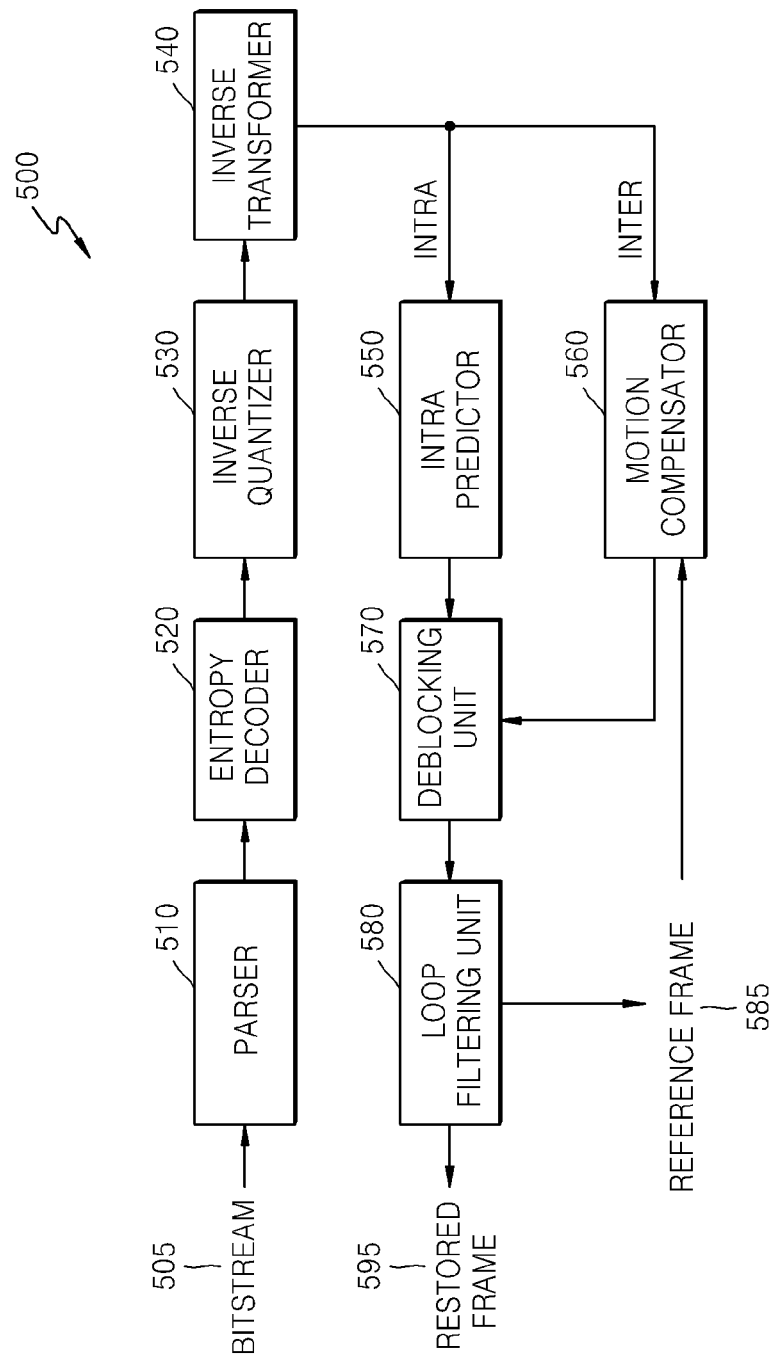
FIG. 15 is a block diagram of an image decoder based on coding units according to an exemplary embodiment.

FIG. 15 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

To decode the image data in the image data decoder 230 of the video decoding apparatus 200, the image decoder 500 may perform operations that are performed after the parser 510 performs an operation.

For the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 performs operations based on a size of a transformation unit for each coding unit.

In particular, when the image decoder 500 decodes an enhancement layer image stream of a multi-view video structure, the motion compensator 560 may perform motion compensation for each respective prediction unit for inter prediction to restore additional view images. When the current additional view key picture is restored, if an additional view key picture (reference key image) that is a reference image of the current additional view key picture is not restored, the current additional view key picture may be restored by using the base view key picture having the same POC order as the current additional view key picture and the depth map of the current additional view key picture.

Figure 16:
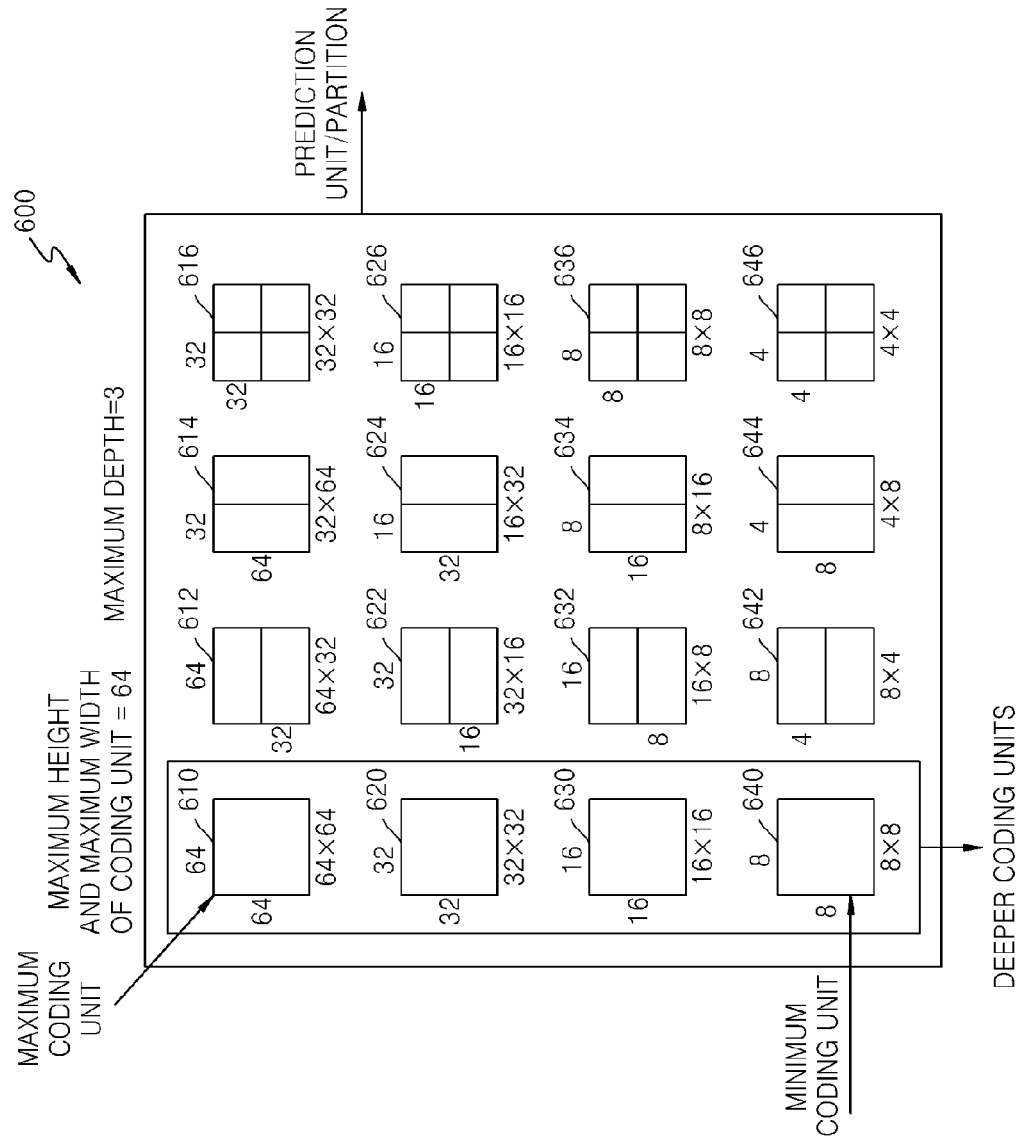
FIG. 16 is a diagram illustrating deeper coding units according to depths, and partitions according to an exemplary embodiment.

FIG. 16 is a diagram illustrating deeper coding units according to depths, and partitions, according to an exemplary embodiment.

The video encoding apparatus 100 and the video decoding apparatus 200 use hierarchical coding units to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. In this case, the maximum depth refers to a total number of times the coding unit is split from the maximum coding unit to the minimum coding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

To determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, to compare encoding results of the same data according to depths, the coding unit corresponding to the depth of 1 and four coding units corresponding to the depth of 2 are each encoded.

To perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 17 is a diagram for describing a relationship between a coding unit 710 and transformation units 720, according to an exemplary embodiment.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 18 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 may extract and use the information 800, 810, and 820 for decoding, according to each deeper coding unit.

Figure 19:
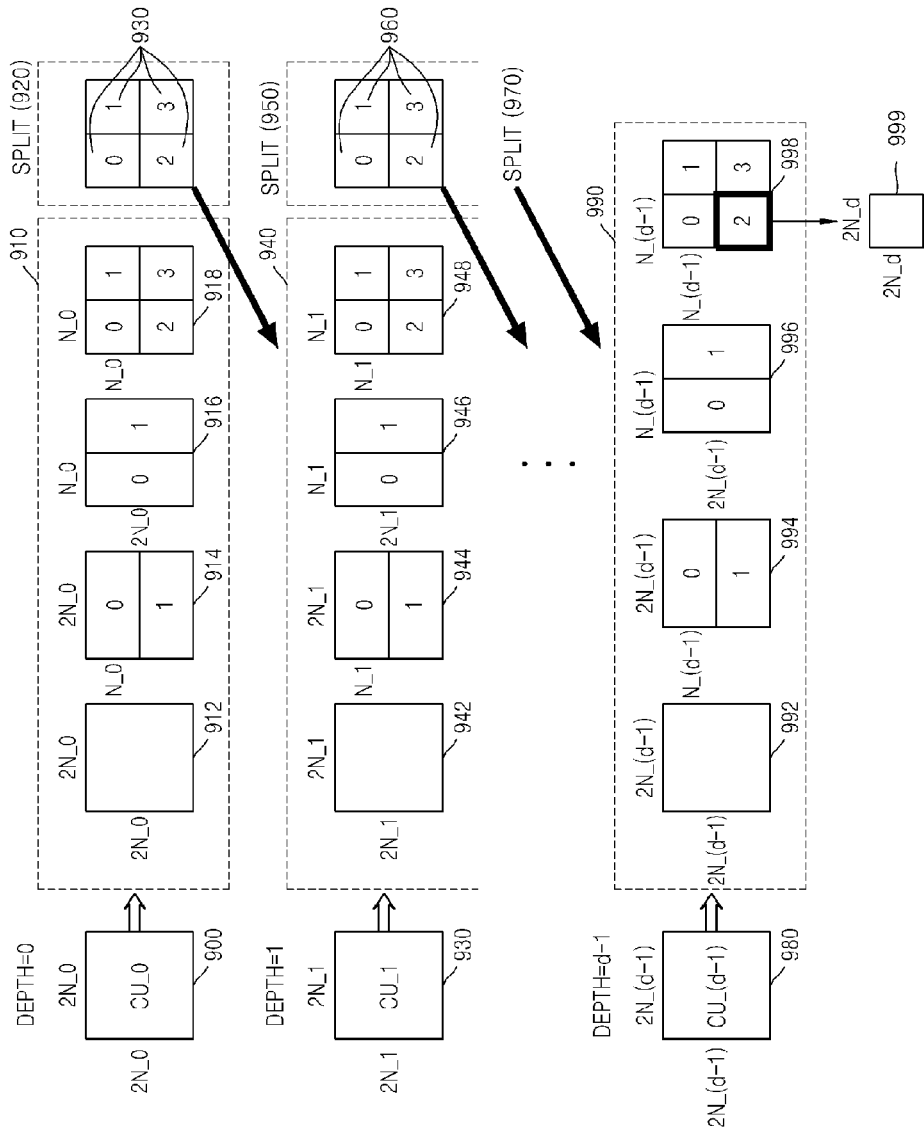
FIG. 19 is a diagram of deeper coding units according to depths, according to an exemplary embodiment.

FIG. 19 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0× N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0× 2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 20:
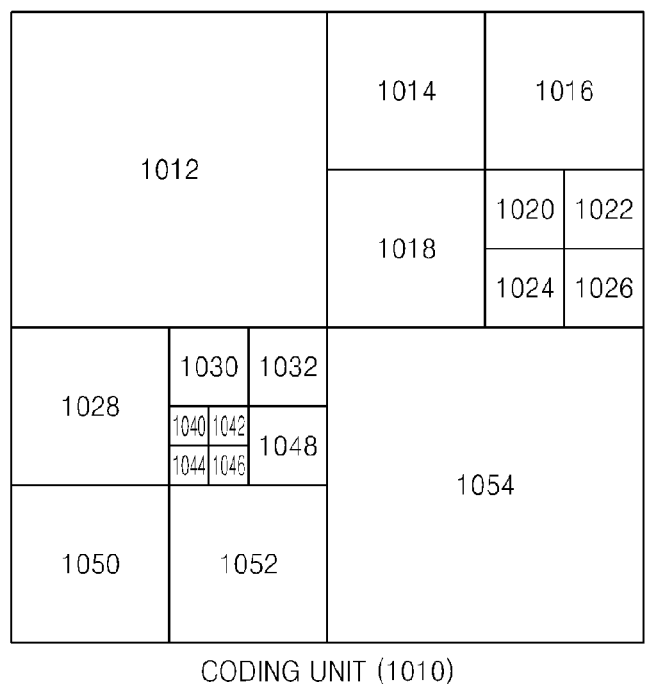
FIGS. 20 through 22 are diagrams for describing a relationship between coding units, prediction units, and transformation units, according to an exemplary embodiment.
Figure 21:
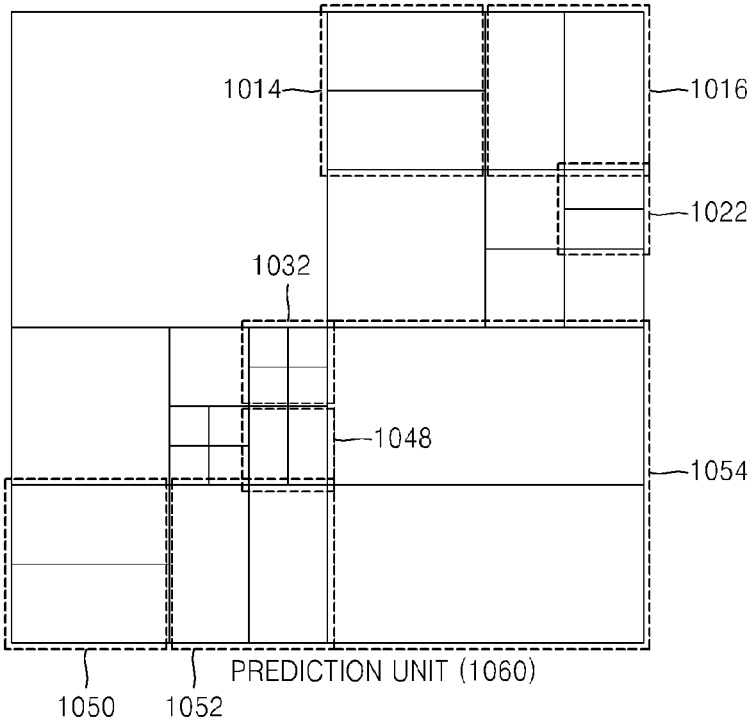
Figure 22:
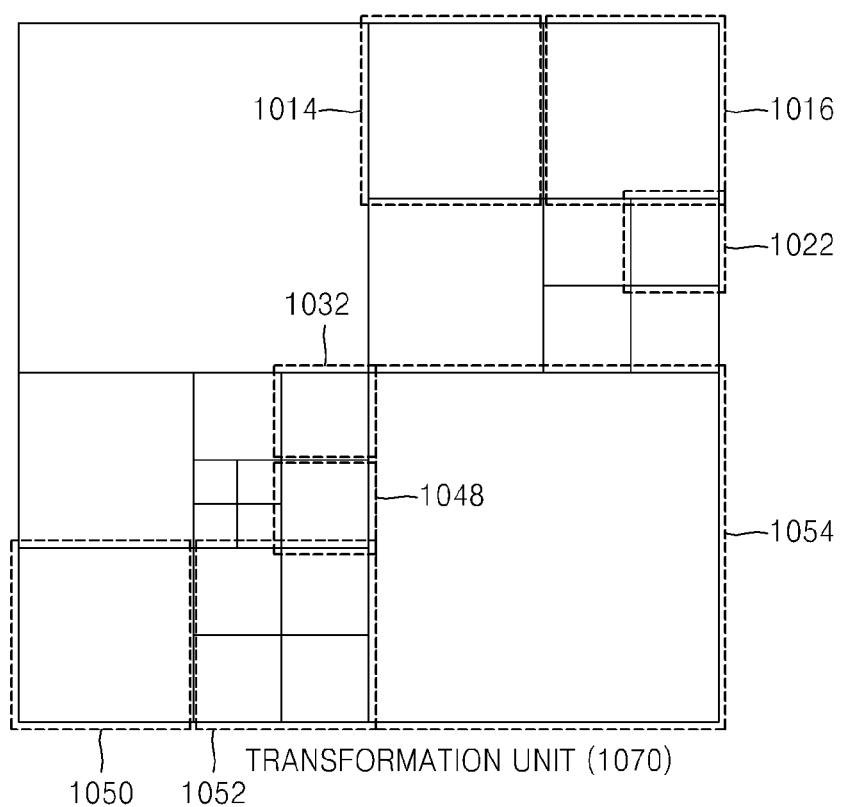

FIGS. 20 through 22 are diagrams for describing a relationship between coding units 1010, prediction units 1060, and transformation units 1070, according to an exemplary embodiment.

depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| | | | Split Information 0 (Encoding on Coding Unit having Size of 2N × 2N and Current Depth of d) | | | Split Information 1 |
|---|---|---|---|---|---|---|
| | | | | Size of Transformation Unit | | |
| Prediction Mode | Symmetrical Partition Type | Asymmetrical Partition Type | Partition Type | Split Information 0 of Transformation Unit | Split Information 1 of Transformation Unit | |
| Intra Inter Skip (Only 2N × 2N) | 2N × 2N 2N × N N × 2N N × N | 2N × nU 2N × nD nL × 2N nR × 2N | | 2N × 2N | N × N (Symmetrical Type) N/2 × N/2 (Asymmetrical Type) | Repeatedly Encode Coding Units having Lower Depth of d + 1 |

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 23:
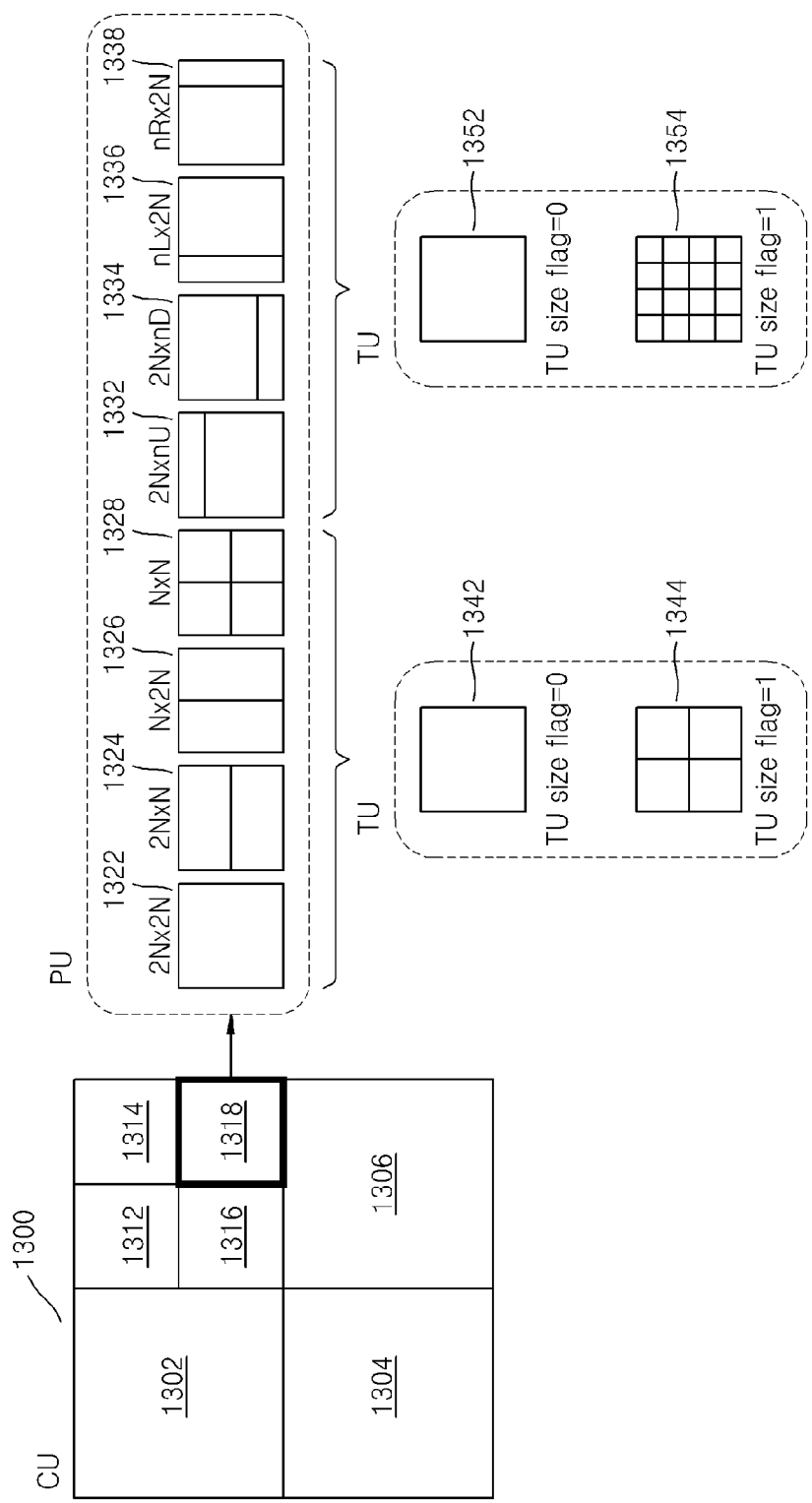
FIG. 23 is a diagram for describing a relationship between a coding unit, a prediction unit or a partition, and a transformation unit, according to encoding mode information.

FIG. 23 is a diagram for describing a relationship between a coding unit, a prediction unit or a partition, and a transformation unit, according to encoding mode information. FIG. 23 will be described with reference to the encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU (Transformation Unit) size flag) of a transformation unit is a type of a transformation index. The size of the transformation unit corresponding to the transformation index may be changed according to a prediction unit type or partition type of the coding unit.

For example, when the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 23, the TU size flag is a flag having a value or 0 or 1, but the TU size flag is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an exemplary embodiment, together with a maximum size and minimum size of the transformation unit. According to an exemplary embodiment, the video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$CurrMinTuSize = \max(MinTransformSize, RootTuSize/(2^{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize = \min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize = \min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present invention is not limited thereto.

According to the video encoding method based on coding units having a tree structure as described with reference to FIGS. 11 through 23, image data of a spatial region is encoded for each coding unit of a tree structure. According to the video decoding method based on coding units having a tree structure, decoding is performed for each maximum coding unit to restore image data of a spatial region. Thus, a picture and a video that is a picture sequence may be restored. The restored video may be reproduced by a reproducing apparatus, stored in a storage medium, or transmitted through a network.

The exemplary embodiments may be embodied as computer programs and may be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

For convenience of description, a video encoding method according to the multi-view video prediction method, the multi-view video prediction restoring method, or the multi-view video encoding method, which has been described with reference to FIGS. 1 through 23, will be collectively referred to as a video encoding method. in addition, the video decoding method according to the multi-view video prediction restoring method or the multi-view video decoding method, which has been described with reference to FIGS. 1 through 23, will be referred to as a video decoding method.

A video encoding apparatus including the multi-view video prediction apparatus 10, the multi-view video prediction restoring apparatus 20, the video encoding apparatus 100, or the image encoder 400, which has been described with reference to FIGS. 1 through 23, will be referred to as a video encoding apparatus. In addition, a video decoding apparatus including the multi-view video prediction restoring apparatus 20, the video decoding apparatus 200, or the image decoder 500, which has been descried with reference to FIGS. 1 through 23, will be referred to as a video decoding apparatus.

A computer readable recording medium storing a program, e.g., a disc 260, according to an exemplary embodiment will now be described in detail.

Figure 24A:
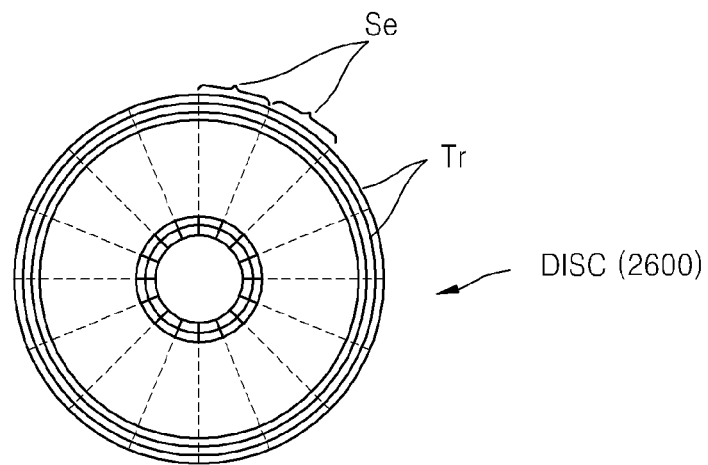
FIG. 24A illustrates a physical structure of a disc that stores a program, according to an exemplary embodiment.

FIG. 24A illustrates a physical structure of a disc 2600 that stores a program, according to an exemplary embodiment. The disc 2600 which is a storage medium may be a hard drive, a compact disc-read only memory (CD-ROM) disc, a Blu-ray disc, or a digital versatile disc (DVD). The disc 2600 includes a plurality of concentric tracks Tf each being divided into a specific number of sectors Se in a circumferential direction of the disc 2600. In a specific region of the disc 2600, a program that executes a method of predicting multi-view video, a method of prediction restoring multi-view video, a method of encoding multi-view video, and a method of decoding multi-view video as described above may be assigned and stored.

A computer system embodied using a storage medium that stores a program for executing a video encoding method and a video decoding method as described above will now be described with reference to FIG. 24B.

Figure 24B:
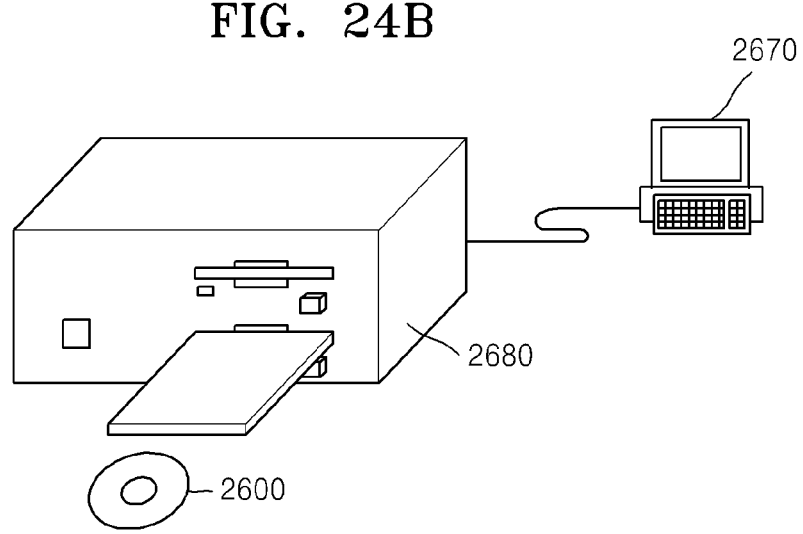
FIG. 24B illustrates a disc drive that records and reads a program by using a disc.

FIG. 24B illustrates a disc drive 2680 that records and reads a program by using a disc 2600. A computer system 2670 may store a program that executes at least one of a video encoding method and a video decoding method according to an exemplary embodiment, in a disc 2600 via the disc drive 2680. To run the program stored in the disc 2600 in the computer system 2670, the program may be read from the disc 260 and be transmitted to the computer system 2670 by using the disc drive 2680.

The program that executes at least one of a video encoding method and a video decoding method according to an exemplary embodiment may be stored not only in the disc 2600 illustrated in FIG. 24A or 24B but also in a memory card, a ROM cassette, or a solid state drive (SSD).

A system to which the video encoding method and a video decoding method described above are applied will be described below.

Figure 25:
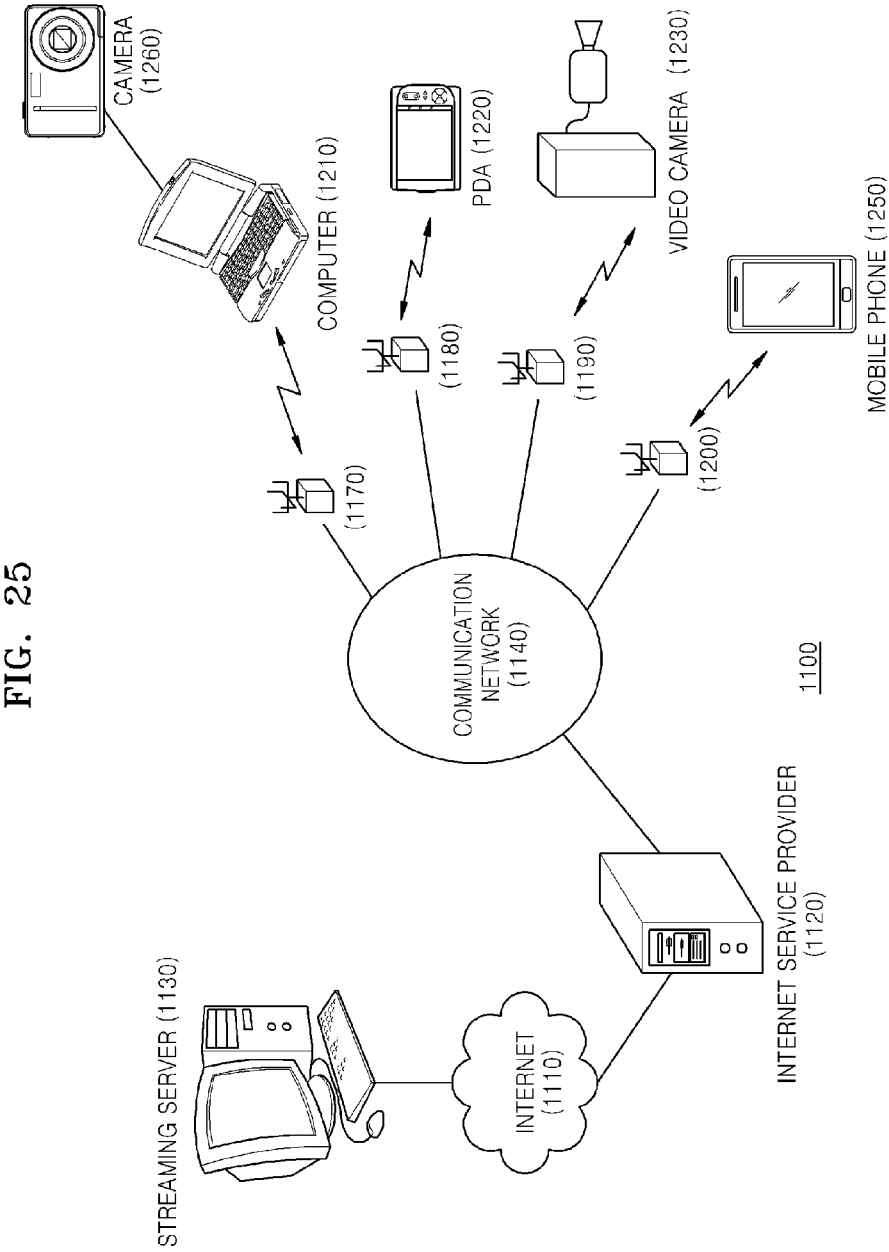
FIG. 25 illustrates an entire structure of a content supply system that provides content distribution service.

FIG. 25 illustrates an entire structure of a content supply system 1100 that provides content distribution service. A service area of a communication system is divided into predetermined-sized cells, and wireless base stations 1170, 1180, 1190, and 1200 are installed in these cells, respectively.

The content supply system 1100 includes a plurality of independent devices. For example, the plurality of independent devices, such as a computer 1210, a personal digital assistant (PDA) 1220, a video camera 1230, and a mobile phone 1250, are connected to the Internet 1110 via an internet service provider 1120, a communication network 1140, and the wireless base stations 1170, 1180, 1190, and 1200.

However, the content supply system 1100 is not limited to as illustrated in FIG. 25, and devices may be selectively connected thereto. The plurality of independent devices may be directly connected to the communication network 1140, not via the wireless base stations 1170, 1180, 1190, and 1200.

The video camera 1230 is an imaging device, e.g., a digital video camera, which is capable of capturing video images. The mobile phone 1250 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 1230 may be connected to a streaming server 1130 via the wireless base station 1190 and the communication network 1140. The streaming server 1130 allows content received from a user via the video camera 1230 to be streamed via a real-time broadcast. The content received from the video camera 1230 may be encoded using the video camera 1230 or the streaming server 1130. Video data captured by the video camera 1230 may be transmitted to the streaming server 1130 via the computer 1210.

Video data captured by a camera 1230 may also be transmitted to the streaming server 1130 via the computer 1210. The camera 1260 is an imaging device capable of capturing both still images and video images, similar to a digital camera. The video data captured by the camera 1260 may be encoded using the camera 1260 or the computer 1210. Software that performs encoding and decoding video may be stored in a computer readable recording medium, e.g., a CD-ROM disc, a floppy disc, a hard disc drive, an SSD, or a memory card, which may be accessible by the computer 1210.

If video data is captured by a camera built in the mobile phone 1250, the video data may be received from the mobile phone 1250.

The video data may also be encoded by a large scale integrated circuit (LSI) system installed in the video camera 1230, the mobile phone 1250, or the camera 1260.

According to an exemplary embodiment, the content supply system 1100 may encode content data recorded by a user using the video camera 1230, the camera 1260, the mobile phone 1250, or another imaging device, e.g., content recorded during a concert, and transmit the encoded content data to the streaming server 1130. The streaming server 1130 may transmit the encoded content data in a type of a streaming content to other clients that request the content data.

The clients are devices capable of decoding the encoded content data, e.g., the computer 1210, the PDA 1220, the video camera 1230, or the mobile phone 1250. Thus, the content supply system 1100 allows the clients to receive and reproduce the encoded content data. Also, the content supply system 1100 allows the clients to receive the encoded content data and decode and reproduce the encoded content data in real time, thereby enabling personal broadcasting.

Encoding and decoding operations of the plurality of independent devices included in the content supply system 1100 may be similar to those of a video encoding apparatus and a video decoding apparatus according to an exemplary embodiment.

The mobile phone 1250 included in the content supply system 1100 according to an exemplary embodiment will now be described in greater detail with referring to FIGS. 26 and 27.

Figure 26:
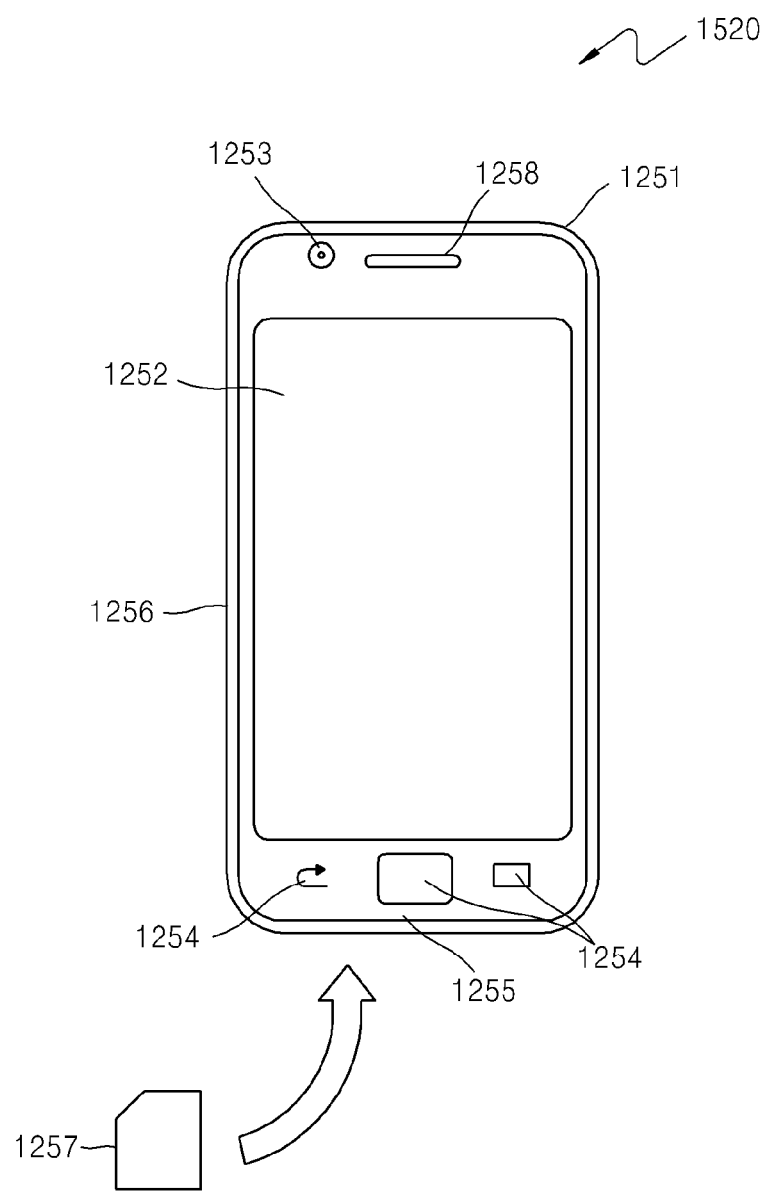
FIGS. 26 and 27 illustrate external and internal structures of a mobile phone to which a video encoding method and a video decoding method are applied, according to an exemplary embodiment.

FIG. 26 illustrates an external structure of a mobile phone 1250 to which a video encoding method and a video decoding method are applied, according to an exemplary embodiment. The mobile phone 1250 may be a smart phone, the functions of which are not limited and a large part of the functions of which may be changed or expanded.

The mobile phone 1250 includes an internal antenna 1251 via which a radio-frequency (RF) signal may be exchanged with the wireless base station 1200 of FIG. 26, and includes a display screen 1252 for displaying images captured by a camera 1253 or images that are received via the antenna 1251 and decoded, e.g., a liquid crystal display (LCD) or an organic light-emitting diodes (OLED) screen. The smart phone 1251 includes an operation panel 1254 including a control button and a touch panel. If the display screen 1252 is a touch screen, the operation panel 1254 further includes a touch sensing panel of the display screen 1252. The smart phone 1251 includes a speaker 1258 for outputting voice and sound or another type sound output unit, and a microphone 1255 for inputting voice and sound or another type sound input unit. The smart phone 1251 further includes the camera 1253, such as a charge-coupled device (CCD) camera, to capture video and still images. The smart phone 1251 may further include a storage medium 1257 for storing encoded/decoded data, e.g., video or still images captured by the camera 1253, received via email, or obtained according to various ways; and a slot 1256 via which the storage medium 1257 is loaded into the mobile phone 1250. The storage medium 1257 may be a flash memory, e.g., a secure digital (SD) card or an electrically erasable and programmable read only memory (EEPROM) included in a plastic case.

Figure 27:
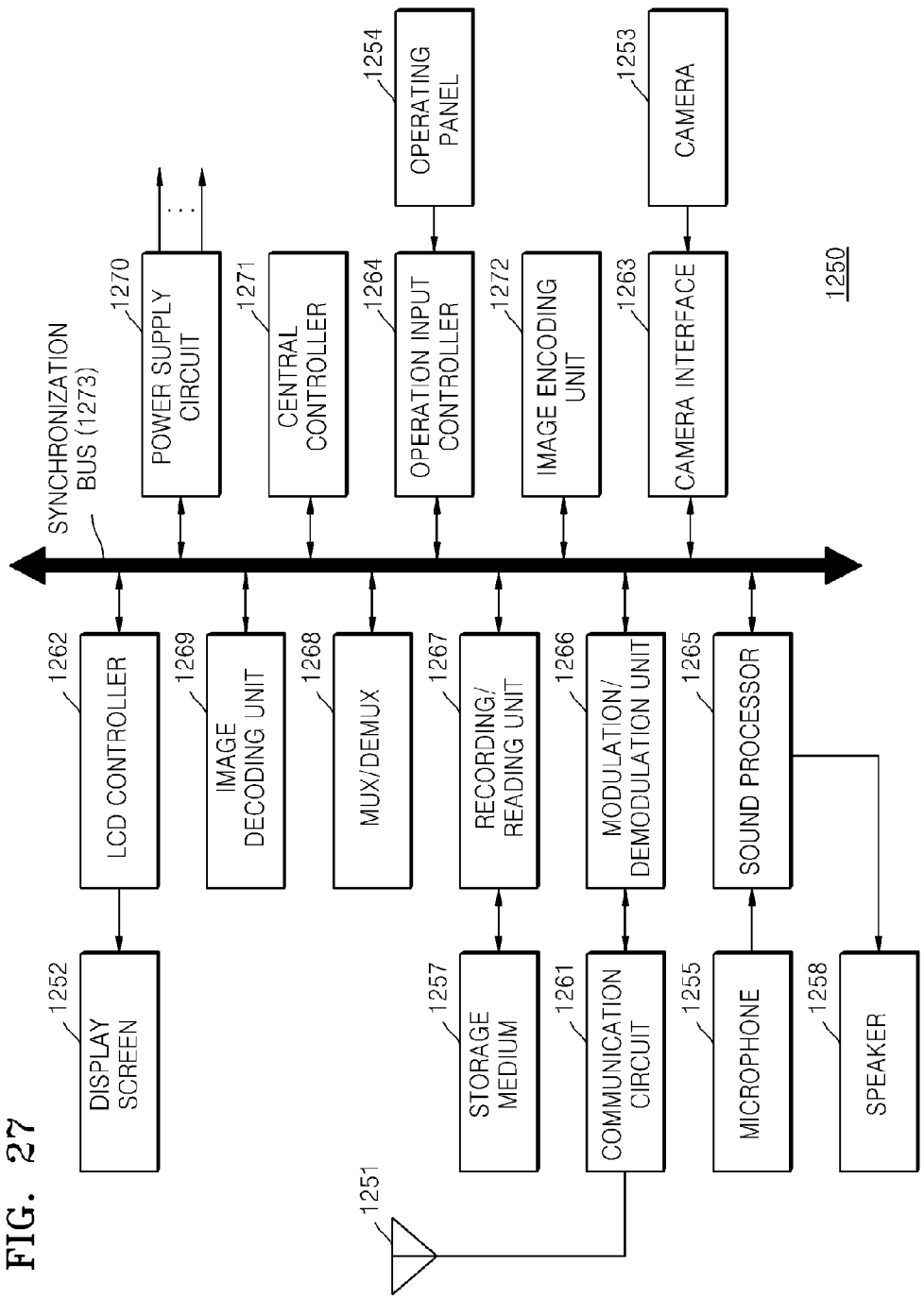

FIG. 27 illustrates an internal structure of the mobile phone 1250, according to an exemplary embodiment. To systemically control parts of the mobile phone 1250 including the display screen 1252 and the operation panel 1254, a power supply circuit 1270, an operation input controller 1264, an image encoding unit 1272, a camera interface 1263, an LCD controller 1262, an image decoding unit 1269, a multiplexer/demultiplexer 1268, a recording/reading unit 1267, a modulation/demodulation unit 1266, and a sound processor 1265 are connected to a central controller 1271 via a synchronization bus 1273.

If a user operates a power button and sets from a 'power off' state to a power on' state, the power supply circuit 1270 supplies power to all the parts of the mobile phone 1250 from a battery pack, thereby setting the mobile phone 1250 in an operation mode.

The central controller 1271 includes a central processing unit (CPU), a ROM, and a random access memory (RAM).

While the mobile phone 1250 transmits and receives communication data, a digital signal is generated in the mobile phone 1250 under control of the central controller. For example, the sound processor 1265 may generate a digital sound signal, the image encoding unit 1272 may generate a digital image signal, and text data of a message may be generated via the operation panel 1254 and the operation input controller 1264. When a digital signal is delivered to the modulation/demodulation unit 1266 under control of the central controller 1271, the modulation/demodulation unit 1266 modulates a frequency band of the digital signal, and a communication circuit 1261 performs digital-to-analog conversion (DAC) and frequency conversion on the frequency band-modulated digital sound signal. A transmission signal output from the communication circuit 1261 may be transmitted to a voice communication base station or the wireless base station 1200 via the antenna 1251.

For example, when the mobile phone 1250 is in a conversation mode, a sound signal obtained via the microphone 1255 is transformed into a digital sound signal by the sound processor 1265, under control of the central controller 1271. The digital sound signal may be transformed into a transformation signal via the modulation/demodulation unit 1266 and the communication circuit 1261, and may be transmitted via the antenna 1251.

When a text message, e.g., email, is transmitted in a data communication mode, text data of the text message is input via the operation panel 1254 and is transmitted to the central controller 1261 via the operation input controller 1264. Under control of the central controller 1261, the text data is transformed into a transmission signal via the modulation/demodulation unit 1266 and the communication circuit 1261 and is transmitted to the wireless base station 1200 via the antenna 1251.

To transmit image data in the data communication mode, image data captured by the camera 1253 is provided to the image encoding unit 1272 via the camera interface 1263. The captured image data may be displayed on the display screen 1252 via the camera interface 1263 and the LCD controller 1262.

A structure of the image encoding unit 1272 may correspond to that of the video encoding apparatus 100 described above. The image encoding unit 1272 may transform the image data received from the camera 1253 into compressed and encoded image data according to a video encoding method employed by the video encoding apparatus 100 or the image encoder 400 described above, and then output the encoded image data to the multiplexer/demultiplexer 1268. During a recording operation of the camera 1253, a sound signal obtained by the microphone 1255 of the mobile phone 1250 may be transformed into digital sound data via the sound processor 1265, and the digital sound data may be delivered to the multiplexer/demultiplexer 1268.

The multiplexer/demultiplexer 1268 multiplexes the encoded image data received from the image encoding unit 1272, together with the sound data received from the sound processor 1265. A result of multiplexing the data may be transformed into a transmission signal via the modulation/demodulation unit 1266 and the communication circuit 1261, and may then be transmitted via the antenna 1251.

While the mobile phone 1250 receives communication data, frequency recovery and ADC are performed on a signal received via the antenna 1251 to transform the signal into a digital signal. The modulation/demodulation unit 1266 modulates a frequency band of the digital signal. The frequency-band modulated digital signal is transmitted to the video decoding unit 1269, the sound processor 1265, or the LCD controller 1262, according to the type of the digital signal.

In the conversation mode, the mobile phone 1250 amplifies a signal received via the antenna 1251, and obtains a digital sound signal by performing frequency conversion and ADC on the amplified signal. A received digital sound signal is transformed into an analog sound signal via the modulation/demodulation unit 1266 and the sound processor 1265, and the analog sound signal is output via the speaker 1258, under control of the central controller 1271.

When in the data communication mode, data of a video file accessed at an Internet website is received, a signal received from wireless base station 1200 via the antenna 1251 is output as multiplexed data via the modulation/demodulation unit 1266, and the multiplexed data is transmitted to the multiplexer/demultiplexer 1268.

To decode the multiplexed data received via the antenna 1251, the multiplexer/demultiplexer 1268 demultiplexes the multiplexed data into an encoded video data stream and an encoded audio data stream. Via the synchronization bus 1273, the encoded video data stream and the encoded audio data stream are provided to the video decoding unit 1269 and the sound processor 1265, respectively.

A structure of the image decoding unit 1269 may correspond to that of the video decoding apparatus 200 described above. The image decoding unit 1269 may decode the encoded video data to obtain restored video data and provide the restored video data to the display screen 1252 via the LCD controller 1262, according to a video decoding method employed by the video decoding apparatus 200 or the image decoder 500 described above.

Thus, the data of the video file accessed at the Internet website may be displayed on the display screen 1252. At the same time, the sound processor 1265 may transform audio data into an analog sound signal, and provide the analog sound signal to the speaker 1258. Thus, audio data contained in the video file accessed at the Internet website may also be reproduced via the speaker 1258.

The mobile phone 1250 or another type of communication terminal may be a transceiving terminal including both a video encoding apparatus and a video decoding apparatus according to an exemplary embodiment, may be a transceiving terminal including only the video encoding apparatus, or may be a transceiving terminal including only the video decoding apparatus.

Figure 28:
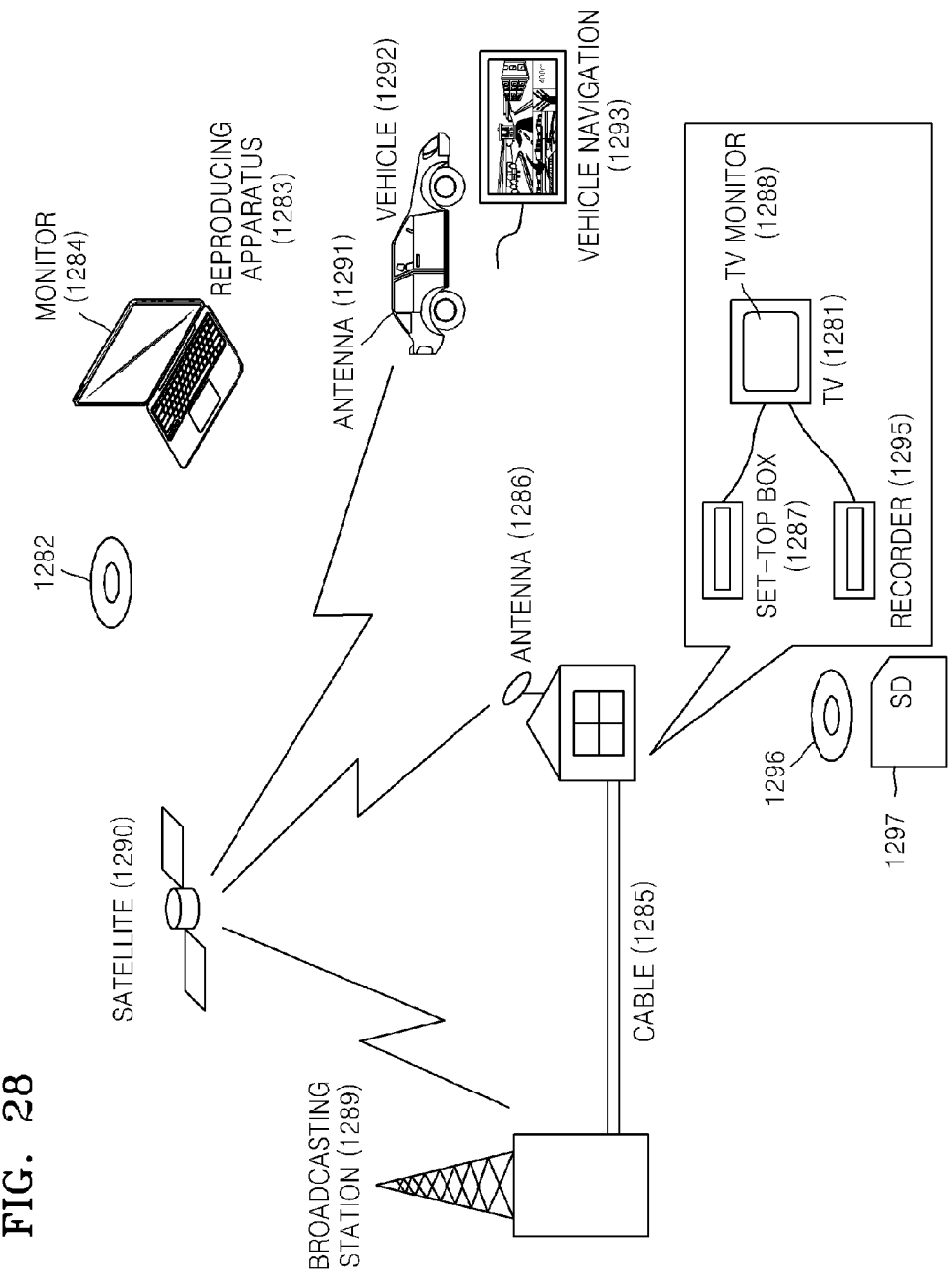
FIG. 28 illustrates a digital broadcasting system employing a communication system, according to an exemplary embodiment.

A communication system according to the present invention is not limited to the communication system described above with reference to FIG. 25. For example, FIG. 28 illustrates a digital broadcasting system employing a communication system, according to an exemplary embodiment. The digital broadcasting system of FIG. 28 may receive a digital broadcast transmitted via a satellite or a terrestrial network by using a video encoding apparatus and a video decoding apparatus according to an exemplary embodiment.

Specifically, a broadcasting station 1289 transmits a video data stream to a communication satellite or a broadcasting satellite 1290 by using radio waves. The broadcasting satellite 1290 transmits a broadcast signal, and the broadcast signal is transmitted to a satellite broadcast receiver via a household antenna 1286. In every house, an encoded video stream may be decoded and reproduced by a TV receiver 1281, a set-top box 1287, or another device.

When a video decoding apparatus according to an exemplary embodiment is implemented in a reproducing apparatus 1283, the reproducing apparatus 1283 may parse and decode an encoded video stream recorded on a storage medium 1282, such as a disc or a memory card to restore digital signals. Thus, the restored video signal may be reproduced, for example, on a monitor 1284.

In the set-top box 1287 connected to the antenna 1286 for a satellite/terrestrial broadcast or a cable antenna 1285 for receiving a cable television (TV) broadcast, a video decoding apparatus according to an exemplary embodiment may be installed. Data output from the set-top box 1287 may also be reproduced on a TV monitor 1288.

As another example, a video decoding apparatus according to an exemplary embodiment may be installed in the TV receiver 1281 instead of the set-top box 1287.

An automobile 1292 including an appropriate antenna 1291 may receive a signal transmitted from the satellite 1290 or the wireless base station 1170 of FIG. 26. A decoded video may be reproduced on a display screen of an automobile navigation system 1293 built in the automobile 1292.

A video signal may be encoded by a video encoding apparatus according to an exemplary embodiment and may then be stored in a storage medium. Specifically, an image signal may be stored in a DVD disc 1296 by a DVD recorder or may be stored in a hard disc by a hard disc recorder 1295. As another example, the video signal may be stored in an SD card 1297. If the hard disc recorder 1295 includes a video decoding apparatus according to an exemplary embodiment, a video signal recorded on the DVD disc 1296, the SD card 1297, or another storage medium may be reproduced on the TV monitor 1288.

The automobile navigation system 1293 may not include the camera 1253, the camera interface 1263, and the image encoding unit 1272 of FIG. 28. For example, the computer 1210 and the TV receiver 1281 may not be included in the camera 1253, the camera interface 1263, and the image encoding unit 1272 of FIG. 28.

Figure 29:
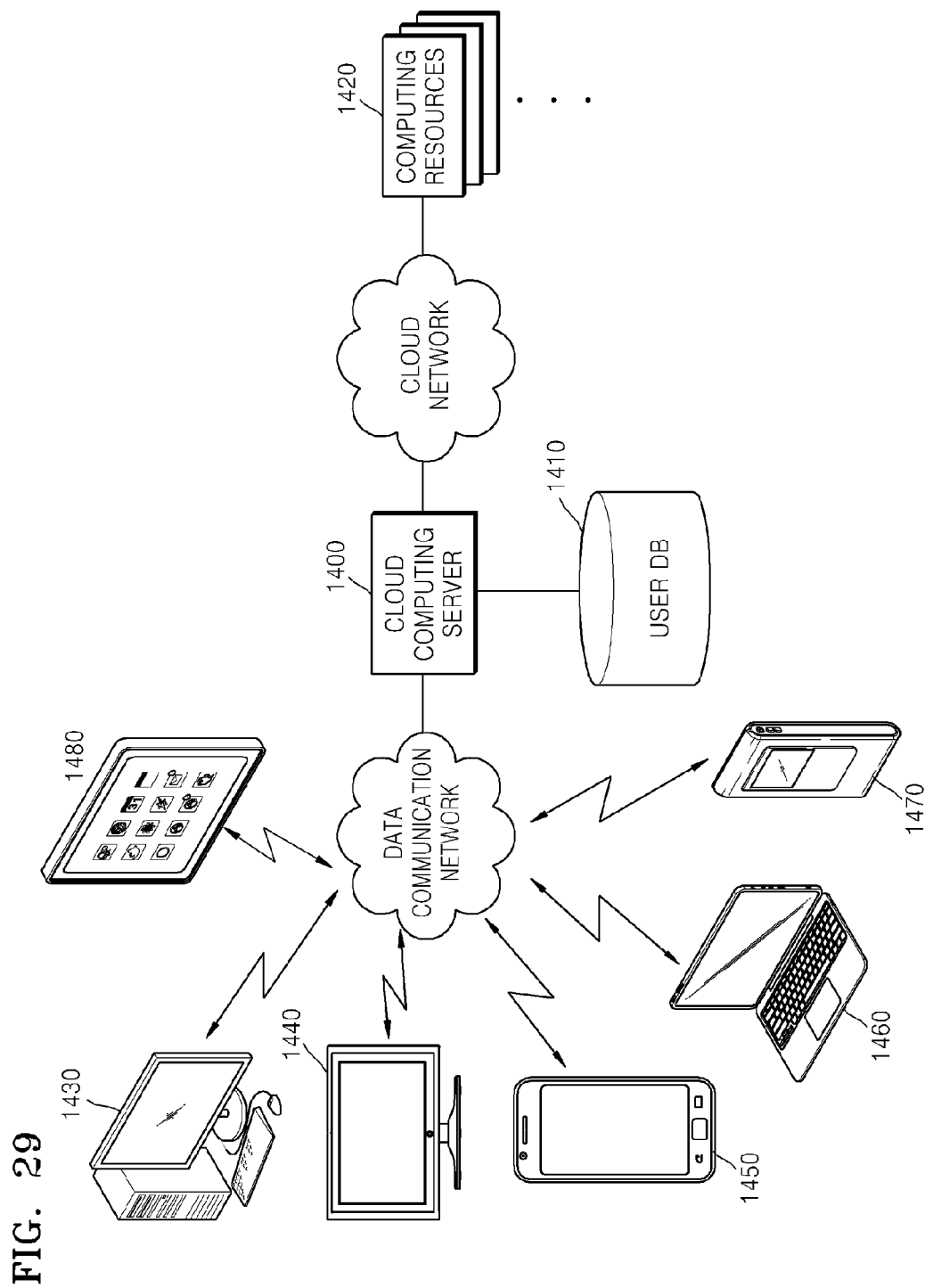
FIG. 29 illustrates a network structure of a cloud computing system using a video encoding apparatus and a video decoding apparatus, according to an exemplary embodiment.

FIG. 29 illustrates a network structure of a cloud computing system using a video encoding apparatus and a video decoding apparatus, according to an exemplary embodiment.

The cloud computing system may include a cloud computing server 1400, a user database (DB) 1410, a plurality of computing resources 1420, and a user terminal.

The cloud computing system provides an on-demand outsourcing service of the plurality of computing resources 1420 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal to use them, but may select and use desired services from among services in a virtual space generated through the virtualization technology, at a desired point of time.

A user terminal of a specified service user is connected to the cloud computing server 1410 via a data communication network including the Internet and a mobile telecommunication network. User terminals may be provided cloud computing services, and particularly video reproduction services, from the cloud computing server 1410. The user terminals may be various types of electronic devices capable of being connected to the Internet, e.g., a desk-top PC 1430, a smart TV 1440, a smart phone 1450, a notebook computer 1460, a portable multimedia player (PMP) 1470, a tablet PC 1480, and the like.

The cloud computing server 1410 may combine the plurality of computing resources 1420 distributed in a cloud network and provide user terminals with a result of the combining. The plurality of computing resources 1420 may include various data services, and may include data uploaded from user terminals. As described above, the cloud computing server 1410 may provide user terminals with desired services by combining video database distributed in different regions according to the virtualization technology.

User information about users who has subscribed to a cloud computing service is stored in the user DB 1410. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 1410 may be shared between user devices. For example, when a video service is provided to the notebook computer 1460 in response to a request from the notebook computer 1460, a reproduction history of the video service is stored in the user DB 1410. When a request to reproduce this video service is received from the smart phone 1450, the cloud computing server 1410 searches for and reproduces this video service, based on the user DB 1410. When the smart phone 1450 receives a video data stream from the cloud computing server 1410, a process of reproducing video by decoding the video data stream is similar to an operation of the mobile phone 1250 described above with reference to FIG. 28.

The cloud computing server 1410 may refer to a reproduction history of a desired video service, stored in the user DB 1410. For example, the cloud computing server 1410 receives a request to reproduce a video stored in the user DB 1410, from a user terminal. If this video was being reproduced, then a method of streaming this video, performed by the cloud computing server 1410 may vary according to the request from the user terminal, i.e., according to whether the video will be reproduced, starting from a start thereof or a pausing point thereof. For example, if the user terminal requests to reproduce the video, starting from the start thereof, the cloud computing server 1410 transmits streaming data of the video starting from a first frame thereof to the user terminal. If the user terminal requests to reproduce the video, starting from the pausing point thereof, the cloud computing server 1410 transmits streaming data of the video starting from a frame corresponding to the pausing point, to the user terminal.

In this case, the user terminal may include a video decoding apparatus as described above with reference to FIGS. 1 to 23. As another example, the user terminal may include a video encoding apparatus as described above with reference to FIGS. 1 to 23. Alternatively, the user terminal may include both the video decoding apparatus and the video encoding apparatus as described above with reference to FIGS. 1 to 23.

Various applications of a video encoding method, a video decoding method, a video encoding apparatus, and a video decoding apparatus according to exemplary embodiments described above with reference to FIGS. 1 to 23 have been described above with reference to FIGS. 24A to 29. However, methods of storing the video encoding method and the video decoding method in a storage medium or methods of implementing the video encoding apparatus and the video decoding apparatus in a device according to various exemplary embodiments, are not limited to the exemplary embodiments described above with reference to FIGS. 24A to 29.

When a multi-view prediction method according to an exemplary embodiment is used, since inter prediction is performed on some key pictures of additional view images, encoding efficiency of the additional view images may be increased and a bit rate of an enhancement layer image stream may be reduced. In addition, since a depth map as well as inter-view prediction is encoded, encoding efficiency of the multi-view video may be improved.

When a multi-view video prediction method according to an exemplary embodiment is used, additional view key pictures may be restored via inter prediction referring to key pictures of the same view as well as inter prediction referring to base view images. In addition, when the key pictures of the same view, which are reference images, are not restored, an additional view image may be restored from a base view image by using a depth map. In addition, a multi-view video having three or more views may be restored by using a depth map and residual values generated via inter-view prediction between a plurality of views.

While the present disclosure has been particularly shown and described with reference to exemplary embodiments thereof, it will be understood by those of ordinary skill in the art that various changes in form and details may be made therein without departing from the spirit and scope according to the present invention as defined by the following claims.

The invention claimed is:

1. A multi-view video prediction encoding method comprising:
   generating a base layer image stream comprising residual values of I-picture base view key pictures and base view images of a base view by performing inter prediction between the base view images; and
   generating an enhancement layer image stream comprising residual values of additional view images of an additional view by performing inter-view prediction for predicting the additional view images with reference to the base view images, performing inter prediction for predicting a different additional view key picture with reference to an additional view key picture from among the additional view images, and performing inter prediction for predicting an additional view image other than the additional view key picture with reference to the additional view images, wherein the additional view key picture and the different additional view key picture belong to a same view;
   generating a depth map indicating an inter-view depth between a base view image among the base view images and an additional view image among the additional view images having a same scene; and
   transmitting the depth map in the base layer image stream and the enhancement layer image stream,
   wherein the depth map is used with a base view image corresponding to a current additional view key picture in order to restore the current additional view key picture, when the current additional view key picture from among the additional view key picture, which is predicted with reference to an additional view key picture restored after restoration of the current additional view key picture, is accessed.

2. The multi-view video prediction encoding method of claim 1, wherein the generating of the enhancement layer image stream comprises:
   performing inter prediction of a current additional view key picture with reference to an additional view key picture that is restored prior to restoration of the current additional view key picture from among the additional view key pictures.

3. The multi-view video encoding prediction method of claim 1, wherein the generating of the enhancement layer image stream comprises:
   performing inter prediction of a current additional view key picture with reference to an additional view key picture that is restored after restoration of the current additional view key picture from among the additional view key pictures.

4. A multi-view video prediction restoring method comprising:
   receiving a base layer image stream, an enhancement layer image stream, and a depth map indicating an inter-view depth between a base view image among the base view images and an additional view image among additional view images of the additional view having the same scene;
   restoring from the base layer image stream an I-picture base view key picture and restoring base view images of a base view by performing motion compensation of the base view images with reference to the base view key picture;
   accessing an additional view key picture of an additional view in the enhancement layer image stream;
   restoring the additional view key picture by performing at least one of disparity compensation referring to the restored base view key pictures and motion compensation referring to a different additional view key picture of the enhancement layer image stream, in response to the accessing, wherein the different additional view key picture and the restored additional view key picture belong to a same view; and
   restoring an additional view image other than the additional view key picture by performing at least one of disparity compensation referring to the restored base view images and performing motion compensation referring to a restored additional view image that is first restored in the enhancement layer image stream on an additional view image of the enhancement layer image stream,
   wherein the restoring of the additional view key picture comprises:
      when a current additional view key picture from among the additional view key picture, which is predicted with reference to an additional view key picture restored after restoration of the current additional view key picture, is accessed, restoring the current additional view key picture by using a depth map and a base view image corresponding to the current additional view key picture.

5. The multi-view video prediction restoring method of claim 4, wherein the restoring of the additional view key picture comprises: when a reference image of a current additional view key picture from among additional view key pictures of the additional view is not restored at a point of time when the current additional view key picture is restored, restoring the current additional view key picture by using a depth map and a base view image corresponding to the current additional view key picture.

6. The multi-view video prediction restoring method of claim 5, wherein the restoring of the additional view key picture comprises:
   when a current additional view key picture from among the additional view key pictures, which is predicted with reference to an additional view key picture restored prior to restoration of the current additional view key picture, is accessed, restoring the current additional view key picture by using a depth map and a base view image corresponding to the current additional view key picture.

7. The multi-view video prediction restoring method of claim 4, wherein the restoring of the additional view key picture comprises:

when an additional view key picture, which does not refer to a different additional view key picture from among the additional view key pictures, is accessed, restoring the current additional view key picture with reference to a base view image corresponding to the current additional view key picture.

8. The multi-view video prediction restoring method of claim 4, wherein the restoring of the additional view key picture comprises: when a current additional view key picture, which does not refer to a different additional view key picture from among the additional view key pictures, is accessed, restoring the current additional view key picture by using a depth map and a base view image corresponding to the current additional view key picture.

9. A multi-view video prediction encoding apparatus comprising:
a base layer encoder configured to generate a base layer image stream comprising residual values of I-picture base view key pictures and base view images of a base view by performing inter prediction between the base view images;
an enhancement layer encoder configured to perform inter-view prediction for predicting additional view images of an additional view with reference to the base view images, perform inter prediction for predicting a different additional view key picture with reference to an additional view key picture from among the additional view images, and perform inter prediction for predicting an additional view image other than the additional view key picture with reference to the additional view images, and configured to generate an enhancement layer image stream comprising residual values of the additional view images, wherein the different additional view key picture and the restored additional view key picture belong to a same view, and configured to generate a depth map indicating an inter-view depth between a base view image among the base view images and an additional view image among the additional view images having a same scene; and
a transmitter configured to transmit the depth map in the base layer image stream and the enhancement layer image stream,
wherein the depth map is used with a base view image corresponding to a current additional view key picture in order to restore the current additional view key picture, when the current additional view key picture from among the additional view key picture, which is predicted with reference to an additional view key picture restored after restoration of the current additional view key picture, is accessed.

10. A multi-view video prediction restoring apparatus comprising:
a receiver configured to receive a base layer image stream, an enhancement layer image stream, and a depth map indicating an inter-view depth between a base view image among the base view images and an additional view image among additional view images of the additional view having the same scene;
a base layer decoder configured to restore from the base layer image stream an I-picture base view key picture and base view images of a base view by performing motion compensation of the base view images with reference to the base view key picture; and
an enhancement layer decoder configured to restore, in response to an additional view key picture of an additional view in the enhancement layer image stream being accessed, restore the additional view key picture by performing at least one of disparity compensation referring to the restored base view key pictures and performing motion compensation referring to a different additional view key picture of the enhancement layer image stream, wherein the different additional view key picture and the restored additional view key picture belong to a same view, and configured to restore an additional view image other than the additional view key picture by performing at least one of disparity compensation referring to the restored base view images and motion compensation referring to a restored additional view image that is first restored in the enhancement layer image stream on an additional view image of the enhancement layer image stream,
wherein the enhancement layer decoder is further configured to restore a current additional view key picture by using a depth map and a base view image corresponding to the current additional view key picture, when the current additional view key picture from among the additional view key picture, which is predicted with reference to an additional view key picture restored after restoration of the current additional view key picture, is accessed.

11. A non-transitory computer readable recording medium having recorded thereon a program for executing the multi-view video prediction encoding method of claim 1.

12. A non-transitory computer readable recording medium having recorded thereon a program for executing the multi-view video prediction restoring method of claim 4.

* * * * *